US012301993B2

(12) United States Patent
Wen et al.

(10) Patent No.: US 12,301,993 B2
(45) Date of Patent: May 13, 2025

(54) PHOTOGRAPHING METHOD AND APPARATUS

(71) Applicant: HUAWEI TECHNOLOGIES CO., LTD., Guangdong (CN)

(72) Inventors: Jinsong Wen, Shenzhen (CN); Yiyang Zhang, Shenzhen (CN); Yibo Xing, Shenzhen (CN); Huanwen Peng, Shenzhen (CN); Jinqin Ai, Shenzhen (CN); Yinting Wang, Hangzhou (CN); Yong Guo, Moscow (RU)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 145 days.

(21) Appl. No.: 17/950,494

(22) Filed: Sep. 22, 2022

(65) Prior Publication Data
US 2023/0018004 A1    Jan. 19, 2023

Related U.S. Application Data

(63) Continuation of application No. PCT/CN2021/083081, filed on Mar. 25, 2021.

(30) Foreign Application Priority Data

Mar. 26, 2020 (CN) .......................... 202010227773.9
May 9, 2020 (CN) .......................... 202010387603.7

(51) Int. Cl.
*H04N 23/68* (2023.01)
*G06T 5/50* (2006.01)
(Continued)

(52) U.S. Cl.
CPC ............. *H04N 23/683* (2023.01); *G06T 5/50* (2013.01); *G06T 5/73* (2024.01); *H04N 23/69* (2023.01);
(Continued)

(58) Field of Classification Search
None
See application file for complete search history.

(56) References Cited

U.S. PATENT DOCUMENTS 10,297,034 B2    5/2019 Nash et al.
11,127,119 B1 *  9/2021 Slutsky ..................... G06T 5/60
(Continued)

FOREIGN PATENT DOCUMENTS

CN     102790847 A    11/2012
CN     103718096 A    4/2014
(Continued)

OTHER PUBLICATIONS

English translation of CN-110677556-B, Li, 2021 (Year: 2021).*
Xin Tao et al, Scale-recurrent Network for Deep Image Deblurring, arXiv:1802.01770v1 [cs.CV] Feb. 6, 2018, 9 pages.

*Primary Examiner* — James M Hannett
(74) *Attorney, Agent, or Firm* — WOMBLE BOND DICKINSON (US) LLP

(57) ABSTRACT

This application discloses a photographing method and apparatus, to overcome blurring that occurs during photographing. When a zoom ratio is greater than a first zoom ratio threshold, a long-focus camera is started to capture an image. A zoom ratio of the long-focus camera is greater than or equal to the first zoom ratio threshold. Because a high zoom ratio causes large shake, a rotational blur occurs in the image. According to the photographing method disclosed in this application, a first neural network model for rotational image deblurring is used to implement rotational image deblurring processing. In this way, high imaging quality of an image, a video, or a preview image is presented to a user to some extent, and the imaging effect may not be inferior to the effect of photographing with a tripod.

20 Claims, 11 Drawing Sheets

(51) Int. Cl.
*G06T 5/73* (2024.01)
*H04N 23/69* (2023.01)

(52) U.S. Cl.
CPC ............... *G06T 2207/20084* (2013.01); *G06T 2207/20201* (2013.01); *G06T 2207/20221* (2013.01); *H04N 23/6812* (2023.01)

(56) References Cited

U.S. PATENT DOCUMENTS

| | | | |
|---|---|---|---|
| 2009/0219402 A1* | 9/2009 | Schneider | H04N 23/80 348/208.7 |
| 2016/0316147 A1* | 10/2016 | Bernstein | H04N 23/69 |
| 2017/0310901 A1 | 10/2017 | Sheikh et al. | |
| 2017/0359494 A1 | 12/2017 | Zhou et al. | |
| 2018/0376068 A1 | 12/2018 | Shimatani et al. | |
| 2019/0236452 A1 | 8/2019 | Wang et al. | |
| 2020/0358954 A1* | 11/2020 | Wang | H04N 23/90 |

FOREIGN PATENT DOCUMENTS

| | | | | |
|---|---|---|---|---|
| CN | 104680491 A | | 6/2015 | |
| CN | 105589506 A | | 5/2016 | |
| CN | 108200319 A | | 6/2018 | |
| CN | 108391035 A | | 8/2018 | |
| CN | 108629743 A | | 10/2018 | |
| CN | 110278372 A | | 9/2019 | |
| CN | 110445978 A | | 11/2019 | |
| CN | 110784651 A | | 2/2020 | |
| CN | 110677556 B | * | 9/2021 | ............. G06T 5/003 |
| JP | 2019114250 A | | 7/2019 | |
| WO | 2007023663 A1 | | 3/2007 | |
| WO | 2020051776 A1 | | 3/2020 | |

\* cited by examiner

OIS_X

PHOTOGRAPHING METHOD AND APPARATUS

CROSS-REFERENCE TO RELATED APPLICATIONS

This application is a continuation of International Application No. PCT/CN2021/083081, filed on Mar. 25, 2021, which claims priority to Chinese Patent Application No. 202010227773.9, filed on Mar. 26, 2020, and Chinese Patent Application No. 202010387603.7, filed on May 9, 2020. All of the aforementioned patent applications are hereby incorporated by reference in their entireties.

TECHNICAL FIELD

Embodiments of this application relate to the field of image processing technologies, and, in particular, to a photographing method and apparatus.

BACKGROUND

As users have increasing requirements for long-focus and long-distance photographing, for example, photographing requirements such as moon photographing and long-focus bird photographing, 30×, 50×, and 100× zoom functions are increasingly becoming a standard configuration of a terminal device. A module with optical zoom ratios such as 3×, 5×, and even 10× is usually configured in the terminal device, to obtain high-quality image quality. However, a module with a higher zoom ratio is more sensitive to shake generated during image photographing. Consequently, imaging quality degrades, for example, blurring occurs.

SUMMARY

Embodiments of this application provide a photographing method and apparatus, to overcome imaging blurring caused by shake.

According to a first aspect, an embodiment of this application provides a photographing method. The method is applied to an electronic device including a long-focus camera, and includes: obtaining a zoom ratio; capturing N first images by using the long-focus camera when the zoom ratio is greater than a first zoom ratio threshold, where N is a positive integer, and all of the N first images are images captured for a target scene; and performing first image processing on the N first images to obtain a first target image, where the first image processing includes deblurring processing implemented via a first neural network model, and the deblurring processing includes rotational image deblurring. In addition to the deblurring processing implemented via the first neural network model, the first image processing may further include image post-processing on an image output by the first neural network model. For example, the image post-processing may include any one of the following: automatic white balance (AWB) processing, converting an image to a standard RGB (SRGB) domain by using a color correction matrix (CCM) for color correction, or converting an image to a YUV domain. When the zoom ratio is greater than the first zoom ratio threshold, the long-focus camera is started to capture an image. Because a high zoom ratio causes large shake, a rotational blur occurs in the image. According to the foregoing solution of this application, the first neural network model for rotational image deblurring is used to implement rotational image deblurring processing. In this way, an image, a video, or preview effect presented to a user may not be inferior to effect of photographing with a tripod to some extent.

A zoom ratio of the long-focus camera is greater than or equal to the first zoom ratio threshold. For example, the zoom ratio of the long-focus camera is greater than 5, for example, is 10×.

In one embodiment, the electronic device may further include a first camera, and a zoom ratio of the first camera is less than the first zoom ratio threshold. When the zoom ratio is greater than the first zoom ratio threshold and less than the zoom ratio of the long-focus camera, M second images are captured by using the first camera, where all of the M second images are images captured for the target scene, and M is a positive integer. Further, when the first image processing is performed on the N first images to obtain the first target image, the N first images are processed via the first neural network model to obtain a third image, and the M second images are processed via a second neural network model to obtain a fourth image, where the second neural network model is used to implement translational image deblurring. Then, the first target image is obtained based on the third image and the fourth image. For example, fusion processing is performed on the third image and the fourth image, and then image post-processing and the like are performed on a fused image to obtain the first target image. The first neural network model is used at least to implement rotational image deblurring. The first neural network model may be further used to implement translational image deblurring, de-mosaicing, de-noising, image enhancement, and the like of the image.

For example, the zoom ratio of the first camera is less than or equal to 5 and greater than 1. For example, the first camera is a medium- and long-focus camera.

According to the foregoing embodiment, when the zoom ratio is greater than the first zoom ratio threshold and less than the zoom ratio of the long-focus camera, images are photographed by using the long-focus camera and the first camera whose zoom ratio is less than that of the long-focus camera, deblurring processing is performed via the first neural network model on an image captured by using the long-focus camera, deblurring processing is performed via the second neural network model on an image captured by the first camera, and then an image input by the first neural network model is fused with an image input by the second neural network model. In this way, not only an image blur caused by shake can be removed, but also image enhancement effect can be further achieved. This can improve image quality.

In one embodiment, the electronic device further includes a second camera, and a zoom ratio of the second camera is less than the first zoom ratio threshold. When the zoom ratio is less than or equal to the first zoom ratio threshold, M second images are captured by using the second camera, where all of the M second images are images captured for the target scene, and M is a positive integer. Then, second image processing is performed on the M second images to obtain a second target image, where the second image processing includes translational image deblurring via a second neural network model.

For example, the zoom ratio of the second camera is less than or equal to 5 and greater than 0. For example, the second camera is a medium- and long-focus camera, a primary camera, or a wide-angle camera.

According to the foregoing embodiment, when the zoom ratio is less than the first zoom ratio threshold, an image is captured by using the second camera whose zoom ratio is less than that of the long-focus camera, and then processing is performed on the image via the second neural network model, for example, translational deblurring, de-mosaicing, or image enhancement. This can improve image quality.

In one embodiment, the method may further include: obtaining a first parameter value in a process of capturing the N first images, where the first parameter value is a quantized value used to represent a degree of a rotational blur generated in the first image; and when the first image processing is performed on the N first images, performing deblurring processing on the N first images via the first neural network model by using the first parameter value and the N first images as an input into the first neural network model.

For example, the electronic device may further include the first camera, and the zoom ratio of the first camera is less than the zoom ratio of the long-focus camera. When the zoom ratio is greater than the first zoom ratio threshold, the M second images are captured by using the first camera, where all of the M second images are images captured for the target scene, and M is a positive integer. Further, when the first image processing is performed on the N first images to obtain the first target image, deblurring processing is performed on the N first images via the first neural network model by using the first parameter value and the N first images as the input into the first neural network mode. In addition, the fourth image is output via the second neural network model by using the M second images as an input into the second neural network model, and then the first target image is obtained based on the third image and the fourth image.

In one embodiment, the long-focus camera includes a gyroscope. The obtaining a first parameter value includes: obtaining a shake amount from the gyroscope, where the shake amount is a quantized value of shake generated in a process in which the long-focus camera captures the N first images; and determining the first parameter value based on the shake amount and a first rule, where the first rule includes an association relationship between the shake amount and a quantized value of a rotational image blurring degree.

In the foregoing embodiment, rotational image deblurring processing is performed in combination with the first neural network module by using parameters of components included in the long-focus camera, so that imaging quality of an image can be improved.

In one embodiment, the deblurring processing further includes translational image deblurring. In the foregoing embodiment, the first neural network model can implement not only rotational image deblurring, but also translational image deblurring. This can improve imaging quality of the image.

In one embodiment, the method may further include: obtaining a first parameter value and a second parameter value in a process of capturing the N first images, where the first parameter value is a quantized value used to represent a degree of a rotational blur generated in the first image, and the second parameter value is a quantized value used to represent a degree of a translational blur generated in the first image; when the first image processing is performed on the N first images to obtain the first target image, performing deblurring processing on the N first images via the first neural network model by using the first parameter value, the second parameter value, and the N first images as an input into the first neural network model, and obtaining the first target image based on an image obtained by performing the deblurring processing via the first neural network model, for example, obtaining the first target image by performing image post-processing on the image obtained through the deblurring processing. In the foregoing embodiment, the first parameter value and the second parameter value assist the first neural network model in performing image deblurring processing, to improve imaging quality of an image.

In one embodiment, the method may further include: obtaining a first parameter value, a second parameter value, and exposure time of the first image in a process of capturing the N first images, where the first parameter value is a quantized value used to represent a degree of a rotational blur generated in the first image, the second parameter value is a quantized value used to represent a degree of a translational blur generated in the first image, the exposure time of the first image is directly proportional to the degree of the rotational blur generated in the first image, and the exposure time of the first image is directly proportional to the degree of the translational blur generated in the first image; and when the first image processing is performed on the N first images to obtain the first target image, performing deblurring processing on the N first images via the first neural network model by using the first parameter value, the second parameter value, the exposure time of the first image, and the N first images as an input into the first neural network model, and obtaining the first target image based on an image obtained by performing deblurring processing via the first neural network model.

According to the foregoing embodiment, the first parameter value, the second parameter value, and the exposure time are used to assist the first neural network model in performing image deblurring processing, to improve imaging quality of an image.

In one embodiment, the long-focus camera includes a gyroscope, an optical path adjustment assembly, and a driving assembly. The obtaining a first parameter value and a second parameter value includes: obtaining a shake amount from the gyroscope, and determining a push amount, where the shake amount is a quantized value of shake generated in a process in which the long-focus camera captures the N first images, and the push amount is a quantized value of an actual push force used by the driving assembly to push the optical path adjustment assembly to implement optical image stabilization; and determining the first parameter value based on the shake amount and a first rule, and determining the second parameter value based on the shake amount, the push amount, and a second rule, where the first rule includes an association relationship between the shake amount and a quantized value of a rotational image blurring degree; and the second rule includes an association relationship between a quantized value of a translational image blurring degree, and the shake amount and the push amount.

In the foregoing embodiment, rotational image deblurring processing and translational image deblurring processing are implemented in combination with the first neural network module by using parameters of components included in the long-focus camera (for example, the gyroscope or the driving assembly), so that imaging quality of the image can be improved.

In one embodiment, the first image processing further includes at least one of the following: de-noising processing, de-mosaicing processing, or enhancement processing, where the de-noising processing, the de-mosaicing processing, or the enhancement processing is implemented via the first neural network model.

In the foregoing embodiment, de-noising, de-mosaicing, or enhancement processing is further implemented based on deblurring processing implemented via the first neural network model. In this way, de-noising, de-mosaicing, or enhancement processing is implemented without an additional processing manner, and imaging quality of the image can be improved.

In one embodiment, the first neural network model is obtained by training sample data.

The sample data includes at least a sample image, N blurred sample images, and a third parameter value and a fourth parameter value that correspond to each of the N blurred sample images. A third parameter value corresponding to a first blurred sample image is a quantized value used to represent a degree of a rotational blur generated in the first blurred sample image, the first blurred sample image is any one of the N blurred sample images, and the third parameter value corresponding to the first blurred sample image is calculated based on an amount that is of shake generated during image photographing and that is obtained within specified duration; and the fourth parameter value is a specified value, a fourth parameter value corresponding to the first blurred sample image is a quantized value used to represent a degree of a translational blur generated in the first blurred sample image, and the first blurred sample image is obtained by performing blurring processing on the sample image based on the third parameter value corresponding to the first blurred sample image and the fourth parameter value corresponding to the first blurred sample image.

Because no accurate image can be simultaneously captured for a still image and a blurred image of a same scene, a clear image is blurred with reference to the third parameter value and the fourth parameter value in the foregoing embodiment, to train the first network model. This can resolve a problem that a training sample image cannot be collected.

In one embodiment, the first neural network model is obtained by training sample data.

The sample data includes at least a sample image, N blurred sample images, and a third parameter value corresponding to each of the N blurred sample images, where a third parameter value corresponding to a first blurred sample image is a quantized value used to represent a degree of a rotational blur generated in the first blurred sample image, the first blurred sample image is any one of the N blurred sample images, and the third parameter value corresponding to the first blurred sample image is calculated based on an amount that is of shake generated during image photographing and that is obtained within specified duration; and the first blurred sample image is obtained by performing blurring processing on the sample image based on the third parameter value corresponding to the first blurred sample image.

In one embodiment, the sample data may further include exposure time corresponding to each of the N blurred sample images, exposure time corresponding to all of the N blurred sample images is the same, and the third parameter value corresponding to the first blurred sample image is calculated based on an amount that is of shake generated during image photographing and that is obtained at the exposure time and within specified duration.

According to a second aspect, an embodiment of this application further provides a photographing apparatus. The photographing apparatus is used in an electronic device including a long-focus camera. The photographing apparatus includes corresponding functional modules, which are configured to implement the operations in the foregoing method. For details, refer to detailed descriptions in the method example. Details are not described herein again. Functions may be implemented by hardware, or may be implemented by hardware by executing corresponding software. The hardware or software includes one or more modules corresponding to the foregoing functions. For example, the photographing apparatus includes an obtaining module and a processing module. The obtaining module is configured to: obtain a zoom ratio; and capture N first images by using the long-focus camera when the zoom ratio is greater than a first zoom ratio threshold, where N is a positive integer, and all of the N first images are images captured for a target scene. The processing module is configured to perform first image processing on the N first images to obtain a first target image, where the first image processing includes deblurring processing implemented via a first neural network model, and the deblurring processing includes rotational image deblurring.

According to a third aspect, an embodiment of this application provides an electronic device, including a memory, a processor, and a long-focus camera. The long-focus camera is configured to capture a static or dynamic image. The memory is configured to store a program or instructions. The processor is configured to invoke the program or the instructions, to enable the electronic device to perform the method according to any one of the first aspect or the embodiments of the first aspect. In one embodiment, the processor invokes the program and the instructions to: control the long-focus camera to capture the static or dynamic image, and perform the method described in any one of the first aspect or the embodiments of the first aspect on the captured static or dynamic image.

In one embodiment, the electronic device may further include a first camera and/or a second camera. A zoom ratio of each of the first camera and the second camera is less than that of the long-focus camera.

According to a fourth aspect, this application provides a computer-readable storage medium. The computer-readable storage medium stores a computer program or instructions. When the computer program or the instructions are executed by a terminal device, the terminal device is enabled to perform the method in any one of the first aspect or the possible embodiments of the first aspect.

According to a fifth aspect, this application provides a computer program product. The computer program product includes a computer program or instructions. When the computer program or the instructions are executed by a terminal device, the method in any one of the first aspect or the possible embodiments of the first aspect is implemented.

For technical effects that can be achieved in any one of the second aspect to the fifth aspect, refer to descriptions of beneficial effects in the first aspect. Details are not described herein again.

DESCRIPTION OF EMBODIMENTS

Figure 1:
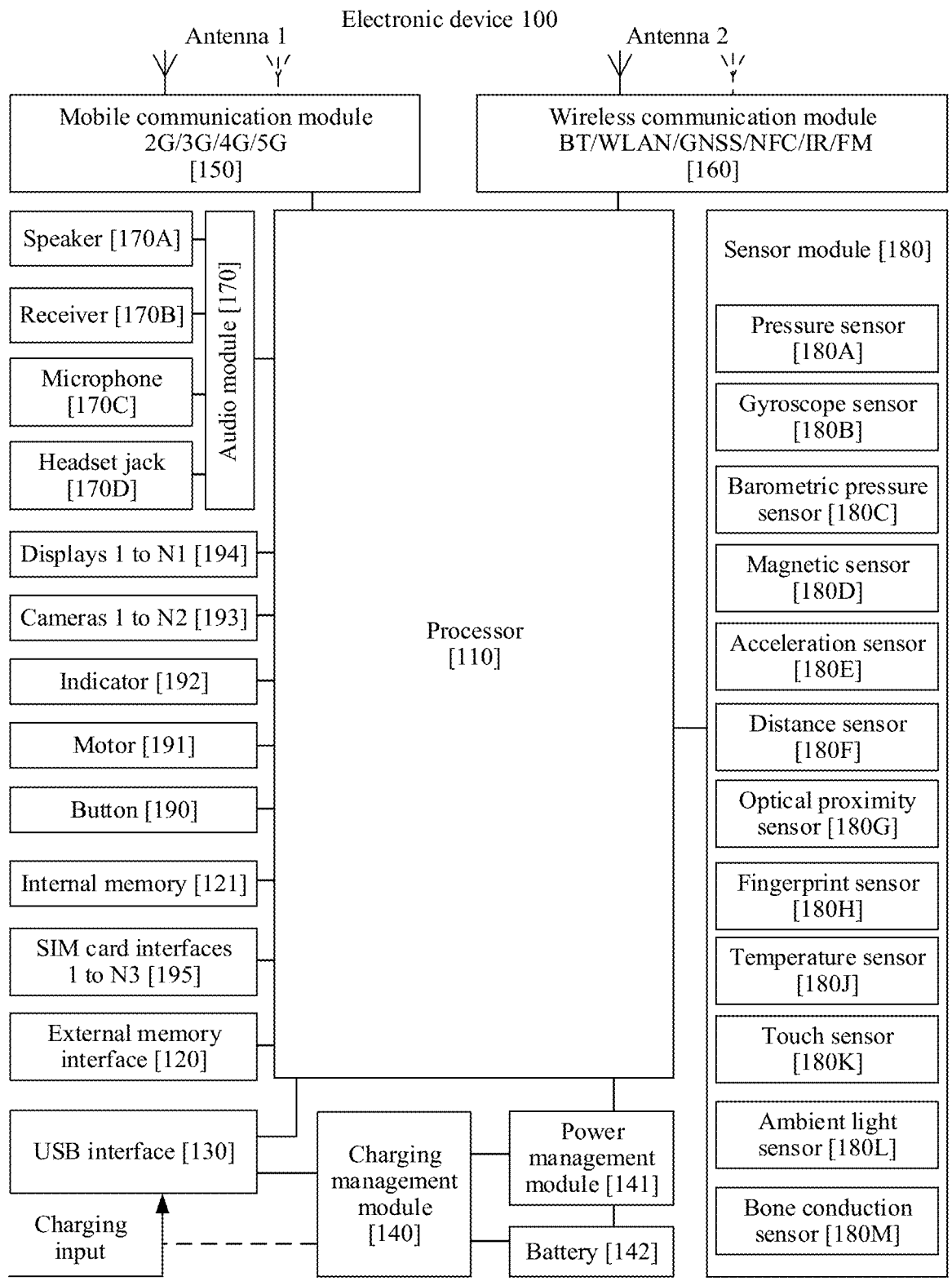
FIG. 1 is a schematic diagram of a hardware structure of an electronic device 100 according to an embodiment of this application.

The following describes in detail embodiments of this application with reference to the accompanying drawings. Terms used in implementations of this application are intended only to explain embodiments of this application, instead of limiting this application. It is clear that the described embodiments are merely some rather than all of embodiments of this application. It should be understood that, all other embodiments obtained by a person of ordinary skill in the art based on embodiments of this application without creative efforts fall within the protection scope of this application.

Before solutions provided in embodiments of this application are described, some terms in this application are generally explained and described, to facilitate understanding of a person skilled in the art. The terms in this application are not limited.

(1) Image blurring: Image blurring means image overlapping caused by translation or rotation of a projection of an object on an imaging plane in an image photographing process. Image blurring may include rotational image blurring and translational image blurring.

Rotation of an image may also be image rotation for short.

Rotational image blurring means blurring with a pixel of an image as a center caused by rotation with the pixel as a center in an image photographing process, where a pixel farther away from the pixel used as the center is more blurry.

Translational image blurring means image overlapping caused by translation of the image along an axis in a horizontal or vertical direction of an imaging plane in an image photographing process.

(2) Neural network model

The neural network model in embodiments of this application may be of a plurality of types of neural network structures, for example, a three-layer encoder-decoder structure. Encoding is to convert an input sequence into a vector of a fixed length. Decoding is to convert a previously generated fixed vector into an output sequence. A neural network model that may be used for encoding and decoding may include a convolutional neural network(CNN), a recurrent neural network (RNN), a bidirectional RNN (BiRNN), a long- and short-term memory network (LSTM), a gate recurrent unit (GRU), and the like.

In an example, a convolutional neural network model may be used in embodiments of this application. The convolutional neural network is a deep feedforward artificial neural network. Artificial neurons can perform large-scale image processing in response to surrounding units. The convolutional neural network may include a convolutional layer, a pooling layer, and the like.

(3) Optical image stabilization is also referred to as light shake compensation, and means that in a camera, an imaging light offset caused by shake is canceled out by moving an optical lens component or another component, so that an optical path remains stable, thereby effectively overcoming image blurring caused by camera shake.

In addition, in embodiments of this application, "at least one piece (item)" means one piece (item) or more pieces (items), and "a plurality of pieces (items)" means two pieces (items) or more pieces (items). The term "and/or" describes an association relationship for describing associated objects and represents that three relationships may exist. For example, A and/or B may represent the following cases: Only A exists, both A and B exist, and only B exists, where A and B may be singular or plural. In addition, the character "/" in this specification generally indicates an "or" relationship between the associated objects. "At least one of the following items (pieces)" or a similar expression thereof refers to any combination of these items, including any combination of a single item (piece) or a plurality of items (piece). For example, at least one item (piece) of a, b, or c may represent a, b, c, a-b, a-c, b-c, or a-b-c, where a, b, and c may be singular or plural. In this application, a symbol "(a, b)" represents an open interval with a range greater than a and less than b, "[a, b]" represents a closed interval with a range greater than or equal to a and less than or equal to b, "(a, b]" represents a half-open and half-closed interval with a range greater than a and less than or equal to b, and "(a, b]" represents a half-open and half-closed interval with a range greater than a and less than or equal to b. In addition, unless otherwise stated, ordinal numbers such as "first" and "second" mentioned in embodiments of this application are used to distinguish between a plurality of objects, but are not used to limit sizes, content, a sequence, a time sequence, priorities, importance, or the like of the plurality of objects. For example, the first camera and the second camera are merely used to distinguish between different resources, but do not indicate different sizes, priorities, importance degrees, or the like of the two cameras.

Embodiments of this application are applicable to an electronic device including a long-focus camera. The electronic device may be a device that provides a user with video recording and/or data connectivity, a handheld device with a wireless connection function, or another processing device connected to a wireless modem, for example, a digital camera, a single-lens reflex camera, a mobile phone (or referred to as a "cellular" phone), or a smartphone. The electronic device may be a portable device, a pocket-sized device, a handheld device, a wearable device (for example, a smartwatch), a tablet computer, a personal computer (PC,), a PDA (personal digital assistant), an in-vehicle computer, an uncrewed aerial vehicle, an aerial photographer, or the like. For example, a zoom ratio of the long-focus camera may be 6×, 8×, 10×, 12×, or a higher zoom ratio.

FIG. 1 is a schematic diagram of a structure of optional hardware of an electronic device 100.

The electronic device 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identity module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It may be understood that the example structure in this embodiment of the disclosure does not constitute a limitation on the electronic device 100. In some other embodiments of this application, the electronic device 100 may include more or fewer components than those shown in the figure, combine some components, split some components, or have different component arrangements. The components shown in the figure may be implemented by using hardware, software, or a combination of software and hardware.

The processor 110 may include one or more processing units. For example, the processor 110 may include an application processor (AP), a modem processor, a graphics processing unit (GPU), an image signal processor (ISP), a controller, a video codec, a digital signal processor (DSP), a baseband processor, and/or a neural-network processing unit (NPU). Different processing units may be independent components, or may be integrated into one or more processors.

The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data that has been used or cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. The interfaces may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, and/or a universal serial bus (USB) interface.

The I2C interface is a two-way synchronization serial bus, and includes one serial data line (SDA) and one serial clock line (SCL). In some embodiments, the processor 110 may include a plurality of groups of I2C buses. The processor 110 may be coupled to the touch sensor 180K, a charger, a flashlight, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be configured to perform audio communication, and sample, quantize, and code an analog signal. In some embodiments, the audio module 170 may be coupled to the wireless communication module 160 through the PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component, for example, the display 194 or the camera 193. The MIPI interface includes a camera serial interface (CSI), a display serial interface (DSI), and the like. In some embodiments, the processor 110 communicates with the camera 193 through the CSI interface, to implement a photographing function of the electronic device 100. The processor 110 communicates with the display 194 through the DSI interface, to implement a displaying function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communication module 160, the audio module 170, the sensor module 180, or the like. The GPIO interface may alternatively be configured as an I2C interface, an I2S interface, a UART interface, an MIPI interface, or the like.

The USB interface 130 is an interface that complies with a USB standard specification, and may be a mini USB interface, a micro USB interface, a USB Type-C interface, or the like. The USB interface 130 may be configured to connect to the charger to charge the electronic device 100, and may also be configured to transmit data between the electronic device 100 and a peripheral device, or may be configured to connect to a headset, to play audio by using the headset. The interface may be further configured to connect to another electronic device, for example, an AR device.

It may be understood that an interface connection relationship between the modules that is shown in this embodiment of the disclosure is merely an example for description, and does not constitute a limitation on the structure of the electronic device 100. In some other embodiments of this application, the electronic device 100 may alternatively use an interface connection mode different from that in the foregoing embodiment, or a combination of a plurality of interface connection modes.

The charging management module 140 is configured to receive a charging input from the charger. The charger may be a wireless charger or a wired charger. In some embodiments of wired charging, the charging management module 140 may receive a charging input of a wired charger through the USB interface 130. In some embodiments of wireless charging, the charging management module 140 may receive a wireless charging input by using a wireless charging coil of the electronic device 100. The charging management module 140 supplies power to the electronic device through the power management module 141 while charging the battery 142.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery status of health (electric leakage and impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna in the electronic device 100 may be configured to cover one or more communication frequency bands. Different antennas may be further reused, to improve antenna utilization. For example, the antenna 1 may be reused as a diversity antenna of a wireless local area network. In some other embodiments, an antenna may be used in combination with a tuning switch.

The mobile communication module 150 can provide a solution, applied to the electronic device 100, to wireless communication including 2G, 3G, 4G, 5G, and the like. The mobile communication module 150 may include at least one filter, a switch, a power amplifier, a low noise amplifier (LNA), and the like. The mobile communication module 150 may receive an electromagnetic wave through the antenna 1, perform processing such as filtering or amplification on the received electromagnetic wave, and transmit a processed electromagnetic wave to the modem processor for demodulation. The mobile communication module 150 may further amplify a signal modulated by the modem processor, and convert an amplified signal into an electromagnetic wave for radiation through the antenna 1. In some embodiments, at least a part of functional modules in the mobile communication module 150 may be disposed in the processor 110. In some embodiments, at least a part of functional modules in the mobile communication module 150 and at least a part of modules in the processor 110 may be disposed in a same device.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transmits a processed signal to the application processor. The application processor outputs a sound signal through an audio device (which is not limited to the speaker 170A, the receiver 170B, or the like), or displays an image or a video through the display 194. In some embodiments, the modem processor may be an independent component. In some other embodiments, the modem processor may be independent of the processor 110, and is disposed in a same device as the mobile communication module 150 or another functional module.

The wireless communication module 160 may provide a solution, applied to the electronic device 100, to wireless communication including a wireless local area network (WLAN) (for example, a wireless fidelity (Wi-Fi) network), Bluetooth (BT), a global navigation satellite system (global GNSS), frequency modulation (FM), near field communication (NFC) technology, an infrared (IR) technology, or the like. The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert a processed signal into an electromagnetic wave for radiation through the antenna 2.

In some embodiments, in the electronic device 100, the antenna 1 is coupled to the mobile communication module 150, and the antenna 2 is coupled to the wireless communication module 160, so that the electronic device 100 can communicate with a network and another device by using a wireless communication technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (global GPS), a global navigation satellite system (GLONASS), a BeiDou navigation satellite system (BDS), a quasi-zenith satellite system (QZSS), and/or a satellite based augmentation system (SBAS).

The electronic device 100 implements the displaying function through the GPU, the display 194, the application processor, and the like. The GPU is a microprocessor for image processing, and is connected to the display 194 and the application processor. The GPU is configured to perform mathematical and geometric computation, and render an image. The processor 110 may include one or more GPUs, which execute program instructions to generate or change display information.

The display 194 is configured to display an image, a video, and the like. The display 194 includes a display panel. The display panel may be a liquid crystal display (LCD), an organic light-emitting diode (OLED), an active-matrix organic light-emitting diode (AMOLED), a flexible light-emitting diode (FLED), a mini-LED, a micro-LED, a micro-OLED, a quantum dot light-emitting diode (QLED), or the like. In some embodiments, the electronic device 100 may include one or N1 displays 194, where N1 is a positive integer greater than 1.

The electronic device 100 can implement a photographing function by using the ISP, the camera 193, the video codec, the GPU, the display 194, the application processor, and the like.

The ISP is configured to process data fed back by the camera 193. For example, during photographing, a shutter is pressed, and a ray of light is transmitted to a photosensitive element of a camera through a lens. An optical signal is converted into an electrical signal. The photosensitive element of the camera transmits the electrical signal to the ISP for processing, to convert a processed signal into a visible image. The ISP may further perform algorithm optimization on noise, brightness, and complexion of the image. The ISP may further optimize parameters such as exposure and a color temperature of a photographing scene. In some embodiments, the ISP may be disposed in the camera 193.

The camera 193 is configured to capture a static image or a video. An optical image of an object is generated by using the lens, and is projected onto the photosensitive element. The photosensitive element may be a charge coupled device (CCD) or a complementary metal-oxide-semiconductor (CMOS) phototransistor. The light-sensitive element converts an optical signal into an electrical signal, and then transmits the electrical signal to the ISP for conversion into a digital image signal. The ISP outputs the digital image signal to the DSP for processing. The DSP converts the digital image signal into an image signal in a standard format such as RGB or YUV. In some embodiments, the processor 110 may trigger starting of the camera 193 according to a program or instructions in the internal memory 121, so that the camera 193 captures at least one image and performs corresponding processing on the at least one image according to a program or instructions, for example, rotational image deblurring, translational image deblurring, de-mosaicing, de-noising or enhancement processing, and image post-processing. After processing, the display 194 may display a processed image. In some embodiments, the electronic device 100 may include one or N2 cameras 193, where N2 is a positive integer greater than 1. For example, the electronic device 100 may include at least one front-facing camera and at least one rear-facing camera. For example, the electronic device 100 may further include a side camera. In one embodiment, the electronic device may include two rear-facing cameras, for example, a primary camera and a long-focus camera. Alternatively, the electronic device may include three rear-facing cameras, for example, a primary camera, a wide-angle camera, and a long-focus camera. Alternatively, the electronic device may include four rear-facing cameras, for example, a primary camera, a wide-angle camera, a long-focus camera, and a medium-focus camera. It should be understood that a quantity of rear-facing cameras may alternatively be greater than 4. This is not limited in this application. In addition, a quantity and a type of front-facing cameras are not limited in this application.

A primary camera may also be a main camera for short. A zoom ratio of a primary camera may be 1. A zoom ratio of a wide-angle camera is usually less than 1. For example, a value range of the zoom ratio of the wide-angle camera may be (0, 1). A zoom ratio of a long-focus camera is greater than 5. For example, a zoom ratio of the long-focus camera is 10×. A zoom ratio of a medium- and long-focus camera may be greater than the zoom ratio of the primary camera, and is less than the zoom ratio of the long-focus camera. For example, the zoom ratio of the medium- and long-focus camera may be 2× or 3×.

The digital signal processor is configured to process a digital signal, and may process another digital signal in addition to the digital image signal. For example, when the electronic device 100 selects a frequency, the digital signal processor is configured to perform Fourier transform and the like on frequency energy.

The video codec is configured to compress or decompress a digital video. The electronic device 100 may support one or more video codecs. In this way, the electronic device 100 can play or record videos in a plurality of coding formats, for example, moving picture experts group (MPEG)-1, MPEG-2, MPEG-3, and MPEG-4.

The NPU is a neural-network (NN) computing processor. The NPU quickly processes input information with reference to a structure of a biological neural network, for example, a transfer mode between human brain neurons, and may further continuously perform self-learning. Applications such as intelligent cognition of the electronic device 100 may be implemented by using the NPU, for example, image recognition, facial recognition, speech recognition, and text understanding.

The external memory interface 120 may be configured to connect to an external memory card such as a micro SD card, to extend a storage capability of the electronic device 100. The external memory card communicates with the processor 110 through the external memory interface 120, to implement a data storage function. For example, files such as music and a video are stored in the external memory card.

The internal memory 121 may be configured to store computer-executable program code. The executable program code includes instructions. The internal memory 121 may include a program storage area and a data storage area. The program storage area may store an operating system, an application (for example, a camera application) required by at least one function, and the like. The data storage area may store data (such as an image captured by a camera) created during use of the electronic device 100, and the like. In addition, the internal memory 121 may include a high-speed random access memory, and may further include a nonvolatile memory, for example, at least one magnetic disk storage device, a flash memory device, or a universal flash storage (UFS). The processor 110 runs the instructions stored in the internal memory 121 and/or the instructions stored in the memory disposed in the processor, to execute various function applications of the electronic device 100 and process data. The internal memory 121 may further store corresponding data of a first neural network model or a second neural network model provided in embodiments of this application. The internal memory 121 may further store code used to perform corresponding processing on an image via the first neural network model or the second neural network model. When code that is stored in the internal memory 121 and that is used to perform corresponding processing on the image by using the first neural network model or the second neural network model is run by the processor 110, an image processing function is implemented via the first neural network model or the second neural network model. Certainly, the corresponding data of the first neural network model or the second neural network model provided in embodiments of this application, and the code used to perform corresponding processing on the image via the first neural network model or the second neural network model may be further stored in the external memory. In this case, the processor 110 may run, by using the external memory interface 120, the corresponding data of the first neural network model or the second neural network model, and the code used to perform corresponding processing on the image via the first neural network model or the second neural network model that are stored in the external memory, to implement a corresponding image processing function.

The electronic device 100 may implement audio functions such as music playing and recording through the audio module 170, the speaker 170A, the receiver 170B, the microphone 170C, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode the audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The receiver 170B, also referred to as an "earpiece", is configured to convert an audio electrical signal into a sound signal. When the electronic device 100 is used to answer a call or receive a voice message, the receiver 170B may be put close to a human ear to listen to a voice.

The microphone 170C, also referred to as "mike" or "mic", is configured to convert a sound signal into an electrical signal. When making a call or sending a voice message, a user may make a sound near the microphone 170C through the mouth, to input a sound signal to the microphone 170C. At least one microphone 170C may be disposed in the electronic device 100. In some other embodiments, two microphones 170C may be disposed in the electronic device 100, to collect a sound signal and further implement a noise reduction function. In some other embodiments, three, four, or more microphones 170C may alternatively be disposed in the electronic device 100, to collect a sound signal, reduce noise, further identify a sound source, implement a directional recording function, and the like.

The headset jack 170D is configured to connect to a wired headset. The headset jack 170D may be the USB interface 130, a 3.5 mm open mobile terminal platform (OMTP) standard interface, or a cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are many types of pressure sensors 180A, for example, a resistive pressure sensor, an inductive pressure sensor, and a capacitive pressure sensor. The capacitive pressure sensor may include at least two parallel plates using a conductive material. When a force is applied to the pressure sensor 180A, capacitance between electrodes changes. The electronic device 100 determines pressure strength based on a capacitance change. When a touch operation is performed on the display 194, the electronic device 100 detects intensity of the touch operation by using the pressure sensor 180A. The electronic device 100 may also calculate a touch position based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to a first pressure threshold is performed on an SMS message application icon, an instruction for creating a new SMS message is executed.

The gyroscope sensor 180B may be configured to determine a moving posture of the electronic device 100. In some embodiments, angular velocities of the electronic device 100 around three axes (namely, x, y, and z axes) may be determined by using the gyroscope sensor 180B. The gyroscope sensor 180B may be configured to implement image stabilization during photographing. For example, when the shutter is opened, the gyroscope sensor 180B detects an angle at which the electronic device 100 shakes, calculates, based on the angle, a distance for which a lens module needs to compensate, and allows the lens to cancel out the shake of the electronic device 100 through reverse motion, to implement image stabilization. The gyroscope sensor 180B may also be used in a navigation scene and a somatic game scene.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some embodiments, when the electronic device 100 is a clamshell phone, the electronic device 100 may detect opening and closing of a flip cover by using the magnetic sensor 180D. Further, a feature, for example, automatic unlocking, of the flip cover is set based on a detected open or closed state of the leather case or a detected open or closed state of the flip cover.

The acceleration sensor 180E may detect values of accelerations of the electronic device 100 in various directions (usually on three axes). When the electronic device 100 is still, a value and a direction of gravity may be detected. The acceleration sensor 180E may be further configured to identify a posture of the electronic device, and is used in an application such as switching between a landscape mode and a portrait mode or a pedometer.

The distance sensor 180F is configured to measure a distance. The electronic device 100 may measure a distance through infrared light or a laser. In some embodiments, the electronic device 100 may use the distance sensor 180F to measure a distance, to implement fast focusing in a photographing scene.

For example, the optical proximity sensor 180G may include a light-emitting diode (LED) and an optical detector, for example, a photodiode. The light-emitting diode may be an infrared light-emitting diode. The electronic device 100 emits infrared light by using the light-emitting diode. The electronic device 100 detects infrared reflected light from a nearby object by using the photodiode. When sufficient reflected light is detected, the electronic device 100 may determine that there is an object near the electronic device 100. When insufficient reflected light is detected, the electronic device 100 may determine that there is no object near the electronic device 100. The electronic device 100 may detect, by using the optical proximity sensor 180G, that the electronic device 100 held by the user is close to an ear for a call, to automatically turn off a screen to save power. The optical proximity sensor 180G may also be used in a smart cover mode or a pocket mode to automatically perform screen unlocking or locking.

The ambient light sensor 180L is configured to sense ambient light brightness. In some embodiments, the electronic device 100 may determine exposure time of an image based on brightness of ambient light sensed by the ambient optical sensor 180L. In some embodiments, the electronic device 100 may adaptively adjust brightness of the display 194 based on the brightness of the sensed ambient light. The ambient light sensor 180L may also be configured to automatically adjust white balance during photographing. The ambient light sensor 180L may also cooperate with the optical proximity sensor 180G to detect whether the electronic device 100 is in a pocket to prevent a false touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy by using the temperature detected by the temperature sensor 180J. For example, when the temperature reported by the temperature sensor 180J exceeds a threshold, the electronic device 100 lowers performance of a processor located near the temperature sensor 180J, to reduce power consumption to implement thermal protection. In some other embodiments, when the temperature is lower than another threshold, the electronic device 100 heats the battery 142 to prevent the electronic device 100 from being shut down abnormally because of a low temperature. In some other embodiments, when the temperature is lower than still another threshold, the electronic device 100 boosts an output voltage of the battery 142 to avoid abnormal shutdown caused by a low temperature.

The touch sensor 180K is also referred to as a "touch component". The touch sensor 180K may be disposed on the display 194, and the touch sensor 180K and the display 194 constitute a touchscreen, which is also referred to as a "touch screen". The touch sensor 180K is configured to detect a touch operation performed on or near the touch sensor 180K. The touch sensor may transfer the detected touch operation to the application processor to determine a touch event type. A visual output related to the touch operation may be provided through the display 194. In some other embodiments, the touch sensor 180K may also be disposed on a surface of the electronic device 100, and is in a position different from a position of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a body pulse to receive a blood pressure beating signal. In some embodiments, the bone conduction sensor 180M may also be disposed in the headset, to obtain a bone conduction headset. The audio module 170 may obtain a speech signal through parsing based on the vibration signal of the vibration bone of the vocal-cord part obtained by the bone conduction sensor 180M, to implement a speech function. The application processor may parse heart rate information based on the blood pressure beating signal obtained by the bone conduction sensor 180M, to implement a heart rate detection function.

The button 190 includes a power button, a volume button, and the like. The button 190 may be a mechanical button, or may be a touch button. The electronic device 100 may receive a button input, and generate a button signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, a photographing application and an audio playing application) may correspond to different vibration feedback effects. The motor 191 may also correspond to different vibration feedback effects for touch operations performed on different areas of the display 194. Different application scenarios (for example, time reminding, information receiving, an alarm clock, and a game) may also correspond to different vibration feedback effects. Touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted into the SIM card interface 195 or plugged from the SIM card interface 195, to implement contact with or separation from the electronic device 100. The electronic device 100 may support one or N3 SIM card interfaces, where N3 is a positive integer greater than 1. The SIM card interface 195 may support a nano-SIM card, a micro-SIM card, a SIM card, and the like. A plurality of cards may be inserted into a same SIM card interface 195 at the same time. The plurality of cards may be of a same type or different types. The SIM card interface 195 may be compatible with different types of SIM cards. The SIM card interface 195 may also be compatible with the external memory card. The electronic device 100 interacts with a network through a SIM card, to implement functions such as calling and data communication. In some embodiments, the electronic device 100 uses an eSIM, namely, an embedded SIM card. The eSIM card may be embedded into the electronic device 100 and cannot be separated from the electronic device 100.

A software system of the electronic device 100 may use a layered architecture, an event-driven architecture, a microkernel architecture, a microservice architecture, or a cloud architecture. In embodiments of the disclosure, an Android system with a layered architecture is used as an example to illustrate a software structure of an electronic device 100.

Figure 2:
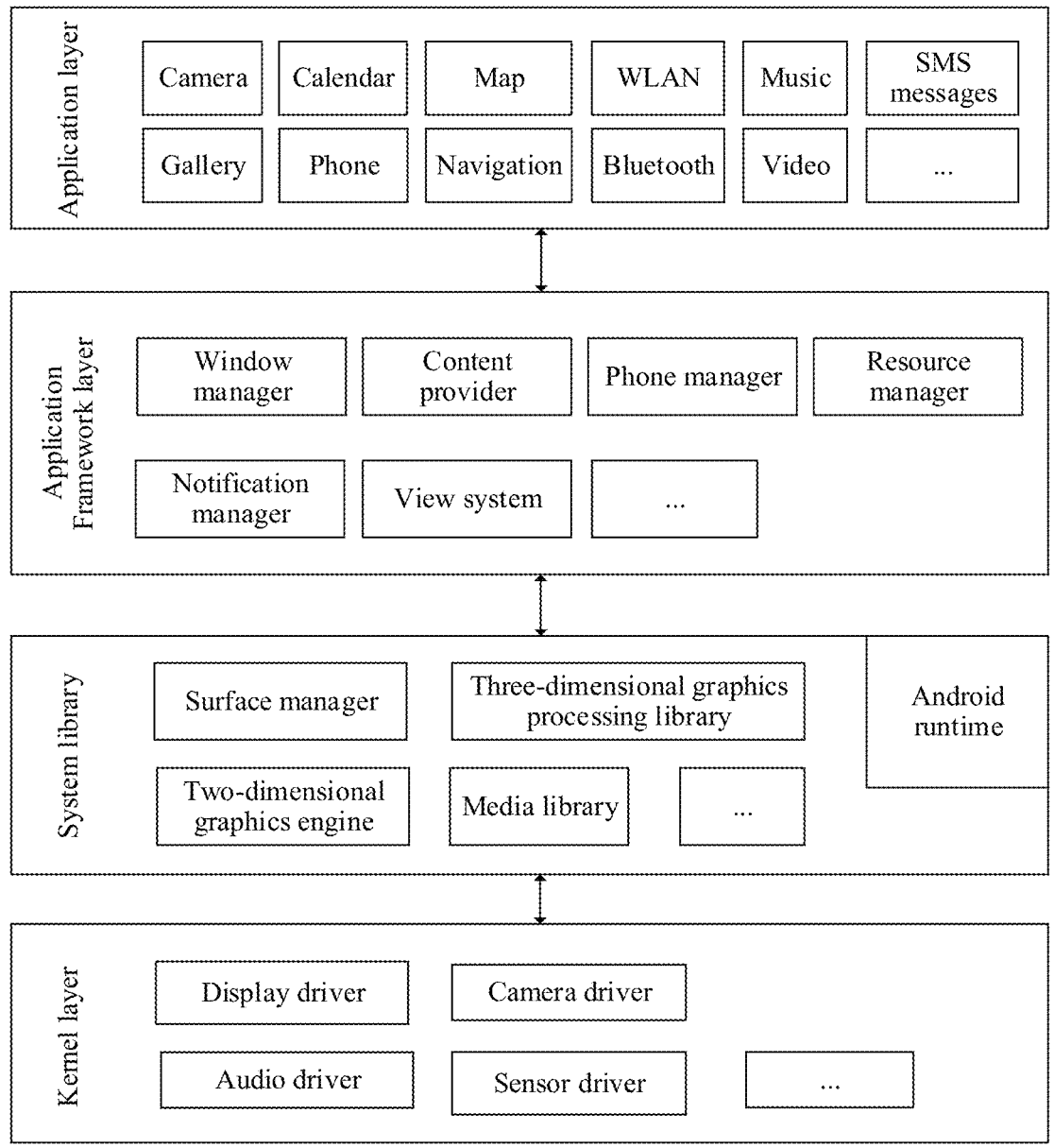
FIG. 2 is a schematic diagram of a software structure of an electronic device 100 according to an embodiment of this application.

FIG. 2 is a block diagram of a software structure of an electronic device 100 according to an embodiment of the disclosure.

In the layered architecture, software is divided into several layers, and each layer has a clear role and task. The layers communicate with each other through a software interface. In some embodiments, an Android system is divided into four layers: an application layer, an application framework layer, an Android runtime and system library, and a kernel layer from top to bottom.

The application layer may include a series of application packages.

As shown in FIG. 2, the application packages may include applications such as Camera, Gallery, Calendar, Phone, Map, Navigation, WLAN, Bluetooth, Music, Videos, and SMS messages.

The application framework layer provides an application programming interface (API) and a programming framework for an application at the application layer. The application framework layer includes some predefined functions.

As shown in FIG. 2, the application framework layer may include a window manager, a content provider, a view system, a phone manager, a resource manager, a notification manager, and the like.

The window manager is configured to manage a window program. The window manager may obtain a size of a display, determine whether there is a status bar, lock a screen, take a screenshot, and the like.

The content provider is configured to store and obtain data, and enable the data to be accessed by an application. The data may include a video, an image, an audio, calls that are made and answered, a browsing history, bookmarks, an address book, and the like.

The view system includes visual controls such as a control for displaying text and a control for displaying a picture. The view system may be configured to construct an application. A display interface may include one or more views. For example, a display interface including a notification icon of SMS messages may include a text display view and a picture display view.

The phone manager is configured to provide a communication function of the electronic device 100, for example, management of call statuses (including answering, declining, and the like).

The resource manager provides various resources such as a localized character string, an icon, an image, a layout file, and a video file for an application.

The notification manager enables an application to display notification information in a status bar, and may be configured to convey a notification type message. The displayed notification information may automatically disappear after a short pause without user interaction. For example, the notification manager is configured to notify download completion, provide a message notification, and the like. The notification manager may alternatively be a notification that appears in a top status bar of the system in a form of a graph or a scroll bar text, for example, a notification of an application that is run on a background, or may be a notification that appears on a screen in a form of a dialog window. For example, text information is displayed in the status bar, an announcement is given, the electronic device vibrates, or the indicator light blinks.

The Android runtime includes a kernel library and a virtual machine. The Android runtime is responsible for scheduling and management of the Android system.

The kernel library includes two parts: a function that needs to be invoked in java language and a kernel library of Android.

The application layer and the application framework layer run on the virtual machine. The virtual machine executes Java files at the application layer and the application framework layer as binary files. The virtual machine is used to implement functions such as object lifecycle management, stack management, thread management, security and exception management, and garbage collection.

The system library may include a plurality of functional modules, for example, a surface manager, a media library, a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playing and recording of a plurality of commonly used audio and video formats, static image files, and the like. The media library may support a plurality of audio and video coding formats, for example, MPEG-4, H.264, MP3, AAC, AMR, JPG, and PNG.

The three-dimensional graphics processing library is used to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, and a sensor driver.

The following describes a working process of software and hardware of the electronic device 100 by using an example with reference to a photographing and capture scene.

When the touch sensor 180K receives a touch operation, a corresponding hardware interrupt is sent to the kernel layer. The kernel layer processes the touch operation into an original input event (including information such as touch coordinates and a timestamp of the touch operation). The original input event is stored at the kernel layer. The application framework layer obtains the original input event from the kernel layer, and identifies a control corresponding to the input event. In an example in which the touch operation is a touch tap operation, and a control corresponding to the tap operation is a control of a camera application icon, the camera application invokes an interface of the application framework layer to start the camera application, then starts the camera driver by invoking the kernel layer, and captures a static image or a video through the camera 193.

Figure 3:
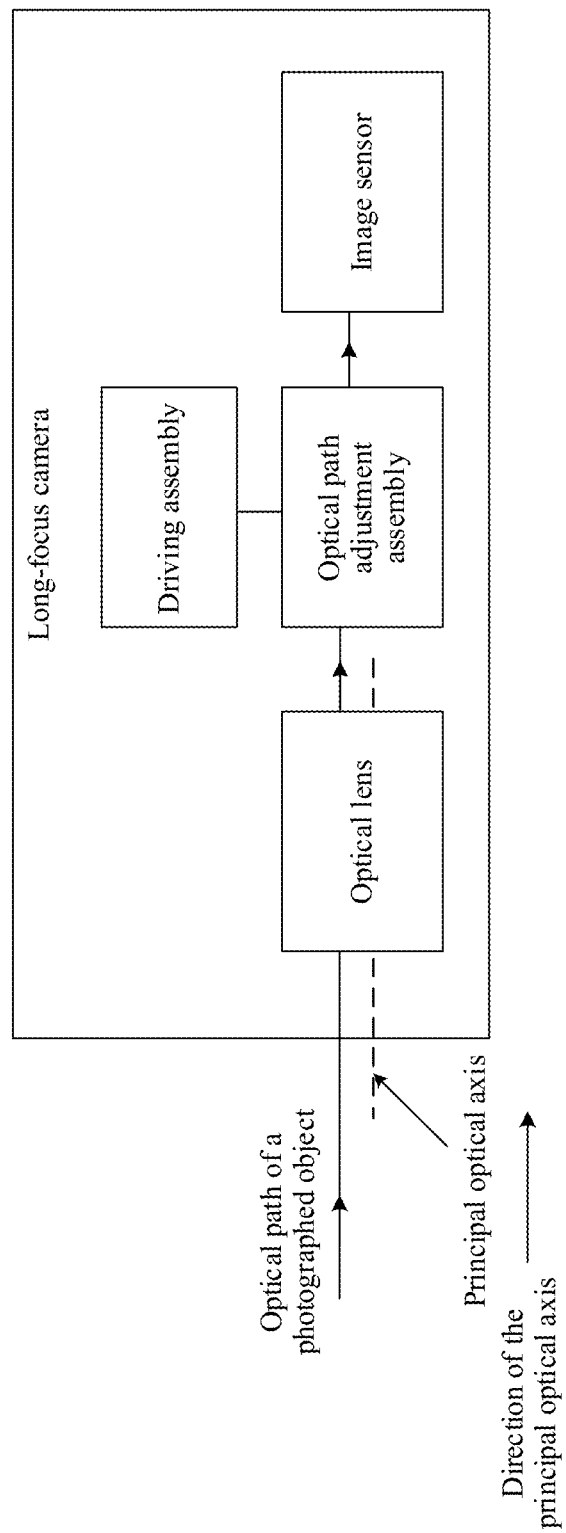
FIG. 3 is a schematic diagram of a long-focus camera according to an embodiment of this application.

FIG. 3 is a schematic diagram of an optional hardware structure of a camera. The camera may include an optical lens, an optical path adjustment assembly, a driving assembly, and an image sensor. The optical path adjustment assembly and the image sensor are successively disposed along a direction of a principal optical axis of the optical lens. The optical lens is configured to receive light from a photographed object. The optical path adjustment assembly is configured to perform optical path reflection or refraction adjustment on the light propagated by the optical lens. The driving assembly is configured to drive the optical path adjustment assembly to move, so that the light folded along the optical path is focused to the image sensor. The image sensor is configured to perform imaging based on the focused light.

The camera shown in FIG. 3 may be a camera whose zoom ratio is greater than 1, for example, a long-focus camera or a medium- and long-focus camera. It should be noted that the long-focus camera in this embodiment of this application may be a periscope long-focus camera or a long-focus camera of another type.

For example, the driving assembly may be an OIS motor or a servo motor. The optical path adjustment assembly includes at least one or more reflective lenses. The optical path adjustment assembly may further include another component, for example, a prism. A structure of the optical path adjustment assembly is not limited in this embodiment of this application.

Figure 4:
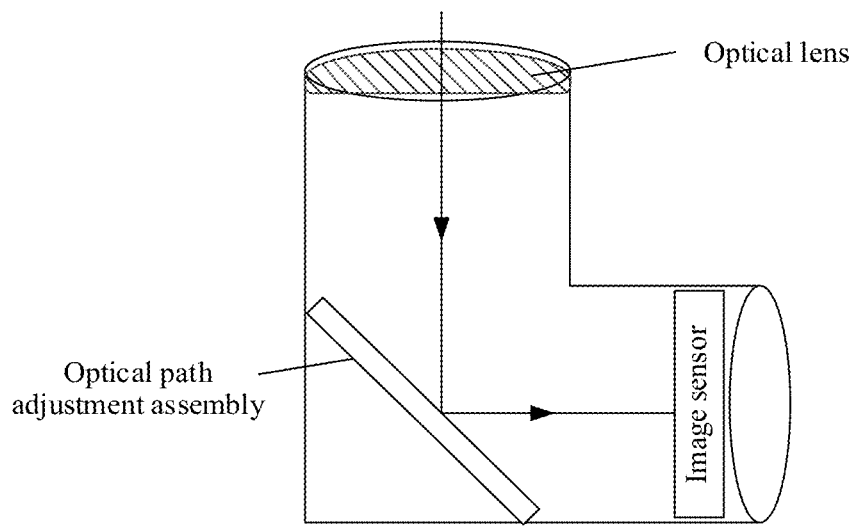
FIG. 4 is a schematic diagram of a periscope long-focus camera according to an embodiment of this application.

In an example, FIG. 4 is a possible schematic diagram of a structure of a periscope long-focus camera. The optical path adjustment assembly of the periscope long-focus camera in FIG. 4 is a reflective lens. FIG. 4 is merely an example, and does not limit the structure of the long-focus camera in this embodiment of this application. A driving assembly corresponding to the reflective lens is not shown in FIG. 4. The driving assembly may push the lens to implement optical image stabilization. For example, shake information may be obtained by using a gyroscope (for example, referred to as gyro), a shake angle may be determined based on the shake information, and OIS image stabilization may be implemented by reversely pushing a reflective lens.

Generally, a range of an angle at which OIS image stabilization can be implemented in an electronic device is implemented is limited, but there are increasing requirements for long-focus and long-distance photographing. However, a higher zoom ratio of a camera causes greater shake, and an insufficient force is applied for reversely pushing the reflective lens. Consequently, an implemented image stabilization angle is insufficient, and finally an image is blurred.

Figure 5A:
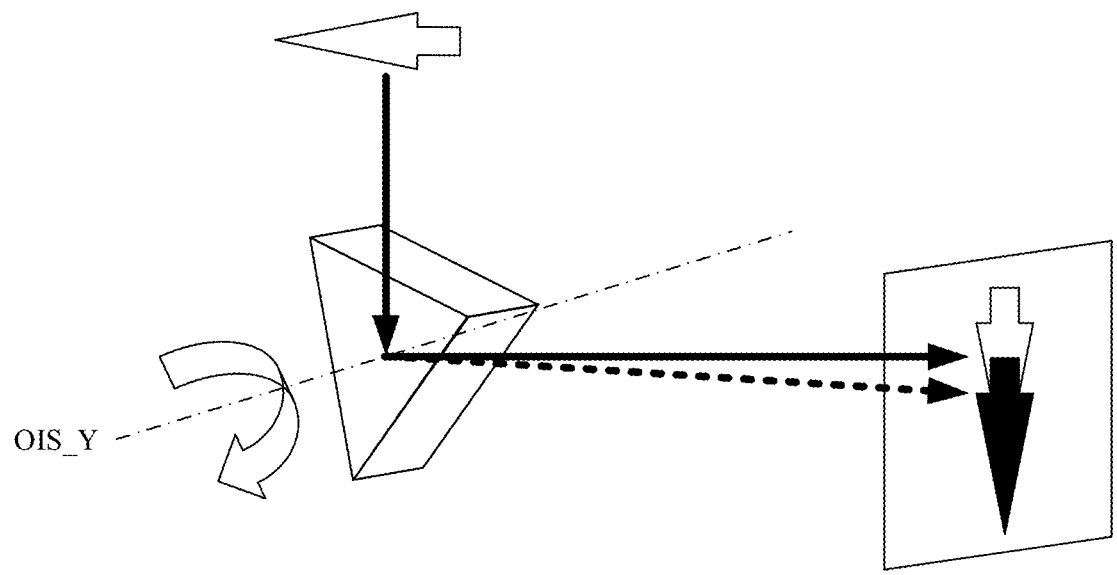
FIG. 5A is a schematic diagram of generating a translational blur according to an embodiment of this application.

Because a plane on which the reflective lens is located is not parallel to a plane on which the gyroscope is located, an angle difference exists between the plane on which the gyroscope is located and the plane on which the reflective lens is located. For example, an angle difference exists between an X axis of the plane on which the gyroscope is located and an X axis of the plane on which the reflective lens is located. For another example, an angle difference exists between a Y axis of the plane on which the gyroscope is located and a Y axis of the plane on which the reflective lens is located. As a zoom ratio of a camera increases, greater shake is caused. When an insufficient force is applied for reversely pushing the reflective lens, an angle difference still exists between a plane on which the pushed gyroscope is located and a plane on which the reflective lens is located. For example, when an angle difference exists between the Y axis of the plane on which the gyroscope is located and the Y axis of the plane on which the reflective lens is located, as shown in FIG. 5A, an image on the image sensor is translated, causing a translational blur. For another example, when an angle difference exists between the X axis of the plane on which the gyroscope is located and the X axis of the plane on which the reflective lens is located, as shown in FIG. 5B, an image on the image sensor is translated, and the image is rotated, causing a translational blur and a rotational blur.

Figure 5B:
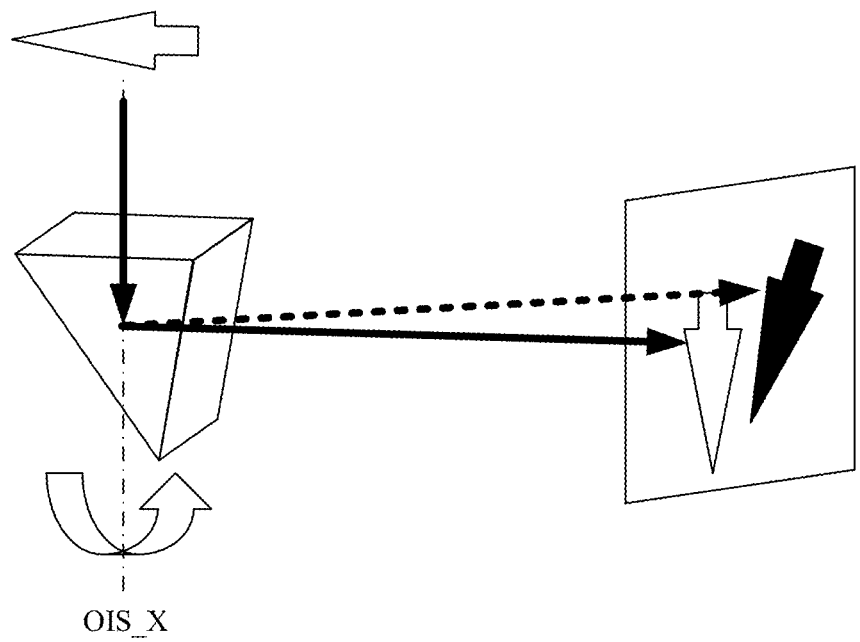
FIG. 5B is a schematic diagram of generating a translational blur and a rotational image blur according to an embodiment of this application.

In FIG. 5A and FIG. 5B, OIS_X and OIS_Y respectively represent an X axis and a Y axis of a reflective lens. A triangular block represents the reflective lens. A non-bold black dashed line represents an X axis or a Y axis of a gyroscope. An arrow with a radian represents rotation caused by hand tremor. Along bold black line with an arrow represents an ideal optical path. A long bold black dashed line with an arrow represents an actual optical path caused by lens rotation. According to FIG. 5A and FIG. 5B, due to hand tremor, an angle difference is caused between a plane on which the gyroscope is located and a plane on which the reflective lens is located. As a result, the reflective lens causes an optical path offset, and finally, image rotation or translation occurs.

In view of this, embodiments of this application provide a photographing method and apparatus, to overcome image blurring caused during photographing, video recording, or previewing in a photographing scene in which a long-focus camera is used.

Figure 6:
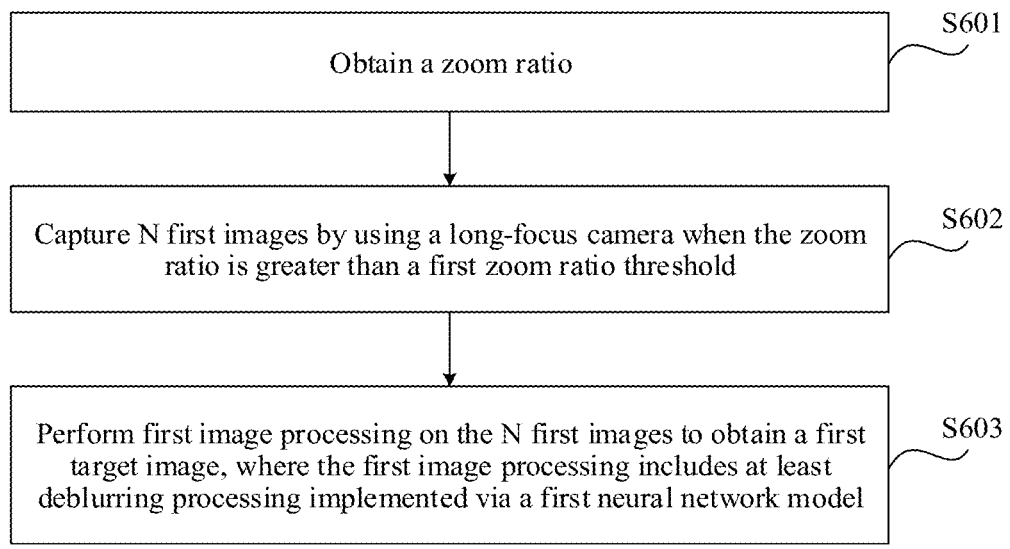
FIG. 6 is a schematic flowchart of a photographing method according to an embodiment of this application.

Refer to FIG. 6. FIG. 6 is a schematic flowchart of a possible photographing method. The photographing method may be applied to the electronic device 100 shown in FIG. 1. The electronic device 100 includes at least a long-focus camera.

S601: Obtain a zoom ratio.

Herein, the zoom ratio may be a default zoom ratio of the electronic device in some photographing modes (for example, a portrait mode or a long-focus mode), or may be a zoom ratio selected by a user on the electronic device.

S602: Capture N first images by using the long-focus camera when the zoom ratio is greater than a first zoom ratio threshold.

N is a positive integer, and all of the N first images are images captured for a target scene.

It should be noted that the N first images are captured through one time of photographing by using the long-focus camera, that is, are obtained through one time of exposure.

A value range of a first zoom ratio threshold A may be [A1, A2). For example, a value range of the first zoom ratio threshold may be [5, 10). For example, the first zoom ratio threshold may be 5, 6, 7, or 8. A zoom ratio of the long-focus camera is greater than or equal to the first zoom ratio threshold. For example, the zoom ratio of the long-focus camera is 10×.

In one embodiment, when the zoom ratio is greater than 9.9, the N first images may be captured by using the long-focus camera.

S603: Perform first image processing on the N first images to obtain a first target image, where the first image processing includes at least deblurring processing implemented via a first neural network model. The deblurring processing includes rotational image deblurring. For example, the deblurring processing may further include translational image deblurring.

It should be understood that, in this embodiment of this application, rotational image deblurring is to reduce a rotational image blurring degree, and similarly, translational image deblurring is to reduce a translational image blurring degree.

In one embodiment, in addition to being used to implement deblurring processing, the first neural network model may be further used to implement at least one of the following: de-noising processing, de-mosaicing processing, or enhancement processing. It should be understood that the de-noising processing is to reduce noise of an image, and the de-mosaicing processing is to reduce mosaics of the image.

In addition to the deblurring processing implemented via the first neural network model, the first image processing may further include image post-processing on an image output by the first neural network model. For example, the image post-processing may include any one of the following: automatic white balance (AWB) processing, converting an image to a standard RGB (standard RGB, SRGB) domain by using a color correction matrix (CCM) for color correction, or converting an image to a YUV domain. "Y" represents luminance (Luminance or Luma), that is, a gray value. "U" and "V" represent chrominance (Chrominance or Chroma), which are used to describe a color and saturation and specify a pixel color.

In this embodiment of this application, a format of an image captured by using the long-focus camera may be raw (RAW), red green blue (RGB), bitmap (BMP), or the like. A raw image is raw data of a digital signal into which an image sensor converts a captured light source signal. A format of an image input into the first neural network model may be RAW, RGB, BMP, or the like. When the format of the image captured by using the long-focus camera is different from the format of the image input into the first neural network model, formats of the N first images captured by using the long-focus camera may be converted into the format of the image input into the first neural network model, and then the images are input into the first neural network model, to implement deblurring processing on the N first images. A format of an image output by the first neural network model may be RAW, RGB, BMP, or the like. In a possible example, the format of the image input into the first neural network model is the same as the format of the output image, for example, both are RAW images. In another possible example, the format of the image input into the first neural network model is different from the format of the output image. For example, a RAW image is input, and an RGB image is output.

For example, the format of the image input into the first neural network model is the same as the format of the output image, and both are RAW images. A format of a first image captured by using the long-focus camera is RAW. Deblurring processing is performed via the first neural network model on the N first images whose format is RAW to obtain processed RAW images; then, image post-processing, for example, automatic white balance (AWB) processing, may be performed on the processed RAW images; then, a color correction matrix (CCM) is used for color correction to convert an AWB-processed image to an SRGB domain; and then the SRGB domain image is converted to a YUV domain image, to obtain a first target image in an RGB format or a BMP format.

In one embodiment, the electronic device may further include a first camera, and a zoom ratio of the first camera is less than the zoom ratio of the long-focus camera. Further, the zoom ratio of the first camera is less than the first zoom ratio threshold. For example, the zoom ratio of the long-focus camera is B1, the zoom ratio of the first camera is B2, and the first zoom ratio threshold is A. B1 is greater than A, and A is greater than B2. For example, a value range of B2 is less than or equal to 5 and greater than 1. For example, the first camera is a medium- and long-focus camera, B1 is 10, B2 is 3, and A is 6.9.

In a possible application scenario, when the zoom ratio is greater than the first zoom ratio threshold, only the long-focus camera is started. For example, the first zoom ratio threshold is 7.9×. For example, when the zoom ratio is 10, the N first images may be captured by using the long-focus camera. Further, deblurring processing is performed on the N first images via the first neural network model.

In another possible application scenario, when the zoom ratio is greater than the first zoom ratio threshold and less than the zoom ratio of the long-focus camera, the long-focus camera and the first camera are started. The first camera may be a medium- and long-focus camera. For example, when the first zoom ratio threshold is 6.9, the second zoom ratio threshold is 9.9, and the zoom ratio is greater than 6.9, for example, the zoom ratio is 7, 8, or 9, the long-focus camera and the first camera may be started. The N first images are captured by using the long-focus camera, and M second images are captured by using the first camera. The M second images are also images captured for the target scene. M is a positive integer. M and N may be the same, or may be different. This is not limited in this embodiment of this application. In this embodiment of this application, a format of an image captured by using the first camera may be RAW, RGB, BMP, or the like. In this scene, when the first image processing is performed on the N first images to obtain the first target image, any one of the following possible manners may be used.

A first possible manner is implemented by performing the following operations R1 to R3.

R1: Perform deblurring processing on at least the N first images via the first neural network model, to obtain a third image.

In one embodiment, the N first images are used as an input into the first neural network model, and the third image is output from the first neural network model.

R2: Process the M second images via a second neural network model to obtain a fourth image, where the second neural network model is used to implement translational image deblurring. The second neural network model may be further used to implement one or more of the following: de-noising processing, de-mosaicing processing, or enhancement processing.

R3: Obtain the first target image based on the third image and the fourth image.

Similar to that of the first neural network model, a format of an image input into the second neural network model may be RAW, RGB, BMP, or the like. A format of an image output by the second neural network model may also be RAW, RGB, BMP, or the like. The format of the image input into the second neural network model may be the same as or different from the format of the output image. When the first target image is obtained based on the third image and the fourth image, fusion processing may be performed on the third image and the fourth image, and image post-processing is performed on a fusion processed image. For image post-processing, refer to the foregoing descriptions. Details are not described herein again.

It should be noted that a plurality of images may be an output from the first neural network model and the second neural network model. For example, the N first images are used as an input into the first neural network model, and L1 images are output, where L2 is less than or equal to N. The M second images are used as an input into the second neural network model, and L2 images are output, where L2 is less than or equal to M. In this scene, fusion processing may be performed on the L1 images output by the first neural network model and the L2 images output by the second neural network model.

In a second possible manner, at least the N first images and the M second images are processed via the first neural network model to obtain a fifth image, and the first target image is obtained based on the fifth image.

In one embodiment, the N first images and the M second images are used as an input into the first neural network model. The first neural network model separately performs deblurring processing on the N first images and the M second images, and performs fusion operation to obtain the fifth image; and then, image post-processing may be performed on the fifth image to obtain the first target image.

In one embodiment, the electronic device may further include a second camera, and a zoom ratio of the second camera is less than the zoom ratio of the long-focus camera. Further, the zoom ratio of the second camera is less than or equal to the first zoom ratio threshold. For example, the second camera may be a medium- and long-focus camera, a primary camera, or a wide-angle camera. For example, the zoom ratio of the second camera is B3, and a value range of B3 may be (0, 5). A is greater than B3. For example, the first zoom ratio threshold A is 6.9. In an example, the second camera is a medium- and long-focus camera, and B3 is 3. In another example, the second camera is a wide-angle camera, a value range of B3 may be (0, 1), and B3 may be 0.3, 0.6, 0.8, or 0.9. In still another example, the second camera is a primary camera, and a zoom ratio of the primary camera is 1. In other words, B3 may be 1.

When the zoom ratio is less than the first zoom ratio threshold, M second images are captured by using the second camera, where all of the M second images are images captured for the target scene, and M is a positive integer; and second image processing is performed on the M second images to obtain a second target image, where the second image processing includes translational image deblurring via a second neural network model. The second image processing may further include image post-processing. Descriptions of the image post-processing are the same as those described above, and details are not described herein again.

For example, when the zoom ratio is greater than 0 and less than 0.9, the M second images may be captured by using the wide-angle camera. When the zoom ratio is greater than or equal to 1 and less than 2.9, the M second images may be captured by using the primary camera. For another example, when the zoom ratio is greater than or equal to 3 and less than 6.9, the M second images may be captured by using the medium- and long-focus camera. In addition, for ease of differentiation, in the following descriptions, an image captured by using a wide-angle camera is referred to as an image 1, an image captured by using a primary camera is referred to as an image 2, and an image captured by using a medium- and long-focus camera is referred to as an image 3.

In the following, a possible photographing method is illustratively shown by using the following example: The electronic device includes a long-focus camera, a medium- and long-focus camera, a primary camera, and a wide-angle camera; a zoom ratio of the long-focus camera is 10, a zoom ratio of the medium- and long-focus camera satisfies A2=3, and a zoom ratio of the wide-angle camera is less than 1 and greater than 0. For descriptions of embodiments of the long-focus camera, the medium- and long-focus camera, the primary camera, and the wide-angle camera, refer to the foregoing related descriptions. Details are not described herein again.

When the zoom ratio falls within [0.6, 0.9], the electronic device may select the wide-angle camera for photographing. In other words, when the zoom ratio falls within [0.6, 0.9], the electronic device may select the wide-angle camera to obtain the second target image. Further, when selecting the wide-angle camera for photographing, the electronic device captures M images 1 by using the wide-angle camera, and then processes the M images 1 via the second neural network model, for example, performs translational image deblurring processing, de-noising processing, de-mosaicing processing, or enhancement processing. Then, image post-processing is performed on an image output by the second neural network model, to obtain the second target image.

When the zoom ratio falls within [1.0, 2.9], the electronic device may select the primary camera for photographing. In other words, when the zoom ratio falls within [1.0, 2.9], the electronic device may select the primary camera to obtain the second target image. Further, the electronic device captures M images 2 by using the primary camera, and then processes the M images 2 via the second neural network model, for example, performs translational image deblurring processing, de-noising processing, de-mosaicing processing, or enhancement processing. Then, image post-processing is performed on an image output by the second neural network model, to obtain the second target image.

When the zoom ratio falls within [3.0, 6.9], the electronic device may select the medium- and long-focus camera with the zoom ratio of 3 for photographing. In other words, when the zoom ratio falls within [3.0, 6.9], the electronic device may use the medium- and long-focus camera with the zoom ratio of 3 to obtain the second target image. Further, the electronic device captures M images 3 by using the medium- and long-focus camera, and then processes the M images 3 via the second neural network model, for example, performs translational image deblurring processing, de-noising processing, de-mosaicing processing, or enhancement processing. Then, image post-processing is performed on an image output by the second neural network model, to obtain the second target image.

When the zoom ratio falls within [7.0, 9.9], the electronic device may select the long-focus camera with the zoom ratio of 10 and the medium- and long-focus camera with the zoom ratio of 3 for photographing. In other words, when the zoom ratio is [7.0, 9.9], the electronic device may obtain the first target image by using the long-focus camera with the zoom ratio of 10 and the second camera with the zoom ratio of 3. Further, the electronic device captures M images 3 by using the medium- and long-focus camera, and captures N first images by using the long-focus camera. Then, first image processing is performed on the N first images and the M images 3 to obtain the first target image. For corresponding descriptions of the first image processing, refer to the first possible manner or the second possible manner. The first possible manner is used as an example. The N first images are processed via the first neural network model to obtain the third image, for example, deblurring processing, de-noising processing, de-mosaicing processing, or enhancement processing is performed. The M images 3 are processed via the second neural network model to obtain the fourth image, for example, translational image deblurring processing, de-noising processing, de-mosaicing processing, or enhancement processing is performed. Then, the third image and the fourth image are fused, and image post-processing is further performed on a fused image to obtain the first target image.

When the zoom ratio is greater than or equal to 10.0, the electronic device may select the long-focus camera with the zoom ratio of 10 for photographing. In other words, when the zoom ratio is greater than or equal to 10.0, the electronic device may obtain the first target image by using the long-focus camera with the zoom ratio of 10. Further, the electronic device captures the N first images by using the long-focus camera. Then, the N first images are processed via the first neural network model, for example, deblurring processing, de-noising processing, de-mosaicing processing, or enhancement processing. Then, image post-processing is performed on the image output by the first neural network model, to obtain the first target image.

In this embodiment of this application, when the N first images are processed via the first neural network model, processing may also be based on data in a process in which the long-focus camera captures the N first images. For ease of description, the data may be referred to as multi-modal data. Certainly, another name may be used. This is not limited in this embodiment of this application. In one embodiment, the multi-modal data and the N first images may be used as an input into the first neural network model, to implement processing on the N first images, for example, deblurring processing, de-noising processing, de-mosaicing processing, or enhancement processing. The multi-modal data may include one or more of the following: a first parameter value, a second parameter value, and exposure time. The first parameter value is a quantized value used to represent a degree of a rotational blur generated in an image. The second parameter value is a quantized value used to represent a degree of a translational blur generated in an image. The exposure time is directly proportional to an image blurring degree. For example, at night or in a dark indoor low-illumination scene, a rotational image blur and a translational blur are strong due to long exposure time. For another example, in an indoor scene with common illumination and an outdoor overcast scene, due to moderate exposure time, a rotational image blur is weak, and a visible translational blur may exist according to a current module inhibition ratio. For another example, in an outdoor environment with high luminance, due to short exposure time, a rotational image blur and a translational blur occasionally occur. The exposure time is used to assist in image deblurring processing to improve deblurring effect. The multi-modal data may also include international organization for standardization (ISO) sensitivity. For example, the ISO sensitivity may be used to assist the first neural network model in performing de-noising processing on an input image.

In this embodiment of this application, the multi-modal data and a to-be-processed image may be input into the first neural network model together based on a requirement for processing an image by the first neural network model, so that the first neural network model processes the input image. The following lists several possible scenarios in which multi-modal data is determined based on the requirement for processing the image by the first neural network model.

In a first scenario, the first neural network model is used to implement rotational image deblurring on the N first images. The multi-modal data may include a first parameter value. In one embodiment, exposure time of the first image may be further included. The exposure time of the first image is directly proportional to a rotational blurring degree of the first image, and longer duration of the exposure time indicates a higher rotational blurring degree of the first image. In a process of photographing the N first images, multi-modal data (the first parameter value and the exposure time) of the first images is obtained, and the multi-modal data and the N first images are used as input into the first neural network model, so that the first neural network model is used to implement rotational image deblurring on the N first images.

The first parameter value may be obtained in the following manner provided in C1 and C2.

A shake amount is obtained from a gyroscope included in the electronic device, where the shake amount is a quantized value of shake generated in a process in which the long-focus camera captures the N first images.

In an example, a gyroscope (or a gyroscope sensor) may be located inside the long-focus camera, or may be located outside the long-focus camera. The gyroscope is configured to collect a shake amount of the electronic device in a process of photographing the N first images. The shake amount may be values of an X-axis and a Y-axis of the gyroscope within exposure time t, or a shake angle provided by the gyroscope. The shake angle of the gyroscope may be determined based on the values of the X-axis and the Y-axis of the gyroscope within the exposure time t. For example, the X-axis is used to determine a shake angle of the X-axis, as shown in the following formula (1).

$$\text{angle}_{hand} = \int_t \text{gyro}\_x \qquad \text{Formula (1)}$$

The first parameter value is determined based on the shake amount and a first rule, where the first rule includes an association relationship between the shake amount and a quantized value of a rotational image blurring degree.

For example, the first rule includes:

$$CODE_x = CODE_{limit} \times \frac{\text{pixel}_x}{\text{pixel}_{limit}} \qquad \text{Formula (2)}$$

$$\text{pixel}_x = a \times \tan(\text{angle}_{hand}) \qquad \text{Formula (3)}$$

The applicant finds that a greater force for reversely driving the optical path adjustment assembly by the driving assembly to implement OIS image stabilization indicates a greater degree of a rotational blur generated in the current image. That is, a larger degree of a rotational blur generated in the image indicates a greater force required for reversely driving the optical path adjustment assembly by the driving assembly. In the following descriptions, for example, the driving assembly is an OIS motor, and the optical path adjustment assembly is a reflective lens. In one embodiment, a greater force for reversely pushing the reflective lens indicates a larger degree of a generated rotational image blur, that is, a larger degree of a rotational blur generated in an image indicates a greater force required for reversely pushing the reflective lens by the OIS motor.

In a possible example, a quantized value of the force for reversely pushing the reflective lens is used to quantize a rotational image blurring degree, that is, $CODE_x$ represents a quantized value of the rotational image blurring degree, that is, the first parameter value. $CODE_x$ is directly proportional to a rotational image blurring amount, for example, a quantity of microns or pixels pixel. $CODE_{limit}$ represents a force for reversely pushing the reflective lens to a push limit, and $CODE_{limit}$ is a calibration value. $\text{pixel}_{limit}$ represents a quantity of pixels in a case in which the reflective lens is pushed reversely to a push limit, and $\text{pixel}_{limit}$ is a calibration value. For example, a long-focus camera with a zoom ratio of 10× is used as an example. In this case, $CODE_{limit}=1500$, a corresponding hand tremor angle is 0.5°, and a value of $\text{pixel}_{limit}$ corresponding to $CODE_{limit}$ is 246.97. The foregoing data is merely an example, and may be determined based on an actual calibration situation.

In a second scenario, the first neural network model is used to implement translational deblurring and rotational deblurring on the N first images. The multi-modal data may include a first parameter value and a second parameter value. In one embodiment, exposure time of the first image may be further included. The exposure time of the first image is also directly proportional to a translational blurring degree of the first image, and longer exposure time indicates a higher translational blurring degree of the first image. In a process of photographing the N first images, multi-modal data of the first images is obtained, and the multi-modal data and the N first images are used as input into the first neural network model, so that the first neural network model is used to implement rotational image deblurring and translational image deblurring on the N first images.

According to the descriptions of the foregoing first scenario, the first parameter value may be determined. For example, the first parameter value is a target push amount, namely, a target push force, that is used by the OIS motor to reversely push the reflective lens and that is determined based on the shake angle.

The second parameter value may be obtained in the following manner provided in D1 and D2:

D1: Determine a push amount, where the push amount is a quantized value of an actual push force, that is, an actual push amount, used by the OIS motor to push the reflective lens.

D2: Determine the second parameter value based on the shake amount, the push amount, and a second rule, where the second rule includes an association relationship between a quantized value of a translational image blurring degree, and the shake amount and the push amount.

The applicant finds that the OIS component (the OIS motor and the reflective lens) causes not only a rotational image blur, but also a translational blur. A design specification of the OIS component in the long-focus camera may not cover all amplitudes of shake generated during image photographing. For example, a maximum value of an angle at which the OIS component can perform image stabilization is 0.5°. However, a shake angle generated in a process of photographing an image by using the long-focus camera may exceed 0.5°. In this case, an excess part cannot be implemented by reversely pushing the reflective lens by using the OIS. Consequently, a translational blur may be caused. In addition, a design principle of image stabilization is usually that a shake angle is first sensed and then a reflective lens is reversely pushed to implement reverse compensation. Consequently, a delay is generated, which may be referred to as a following error. The following error also causes translational blur. Based on this, in this embodiment of this application, $CODE_{propose}$ represents the target push amount, and $CODE_{actual}$ represents the actual push amount. $CODE_{actual}$ may be determined based on the actual push force used by the OIS motor to push the reflective lens.

The second rule may include:

$$\Delta CODE = CODE_{propose} - CODE_{actual} \quad \text{Formula (4)}$$

$$CODE_{propose} = CODE_x \quad \text{Formula (5)}$$

In a third scenario, the first neural network model is used to implement rotational image deblurring and de-noising on the N first images. The multi-modal data may include a first parameter value, a second parameter value, and ISO sensitivity. The ISO sensitivity may be implemented by using an ambient optical sensor of the electronic device and a mapping rule. For the mapping rule, refer to Table 1. It should be understood that Table 1 shows only an example of a mapping relationship between ISO sensitivity and some illuminance detected by the ambient optical sensor. Table 2 shows a relationship between illumination and an environment.

TABLE 1

| Illuminance | ISO sensitivity |
| --- | --- |
| 1 lux to 4 lux | 5000 |
| 5 lux to 19 lux | 1250 |
| 20 lux | 640 |
| 100 lux | 160 |
| 300 lux | 160 |
| 1000 lux or above | 120 |

TABLE 2

| Light intensity (illuminance) | Descriptions |
| --- | --- |
| 0.05 lux to 0.3 lux | On a bright full-moon night |
| 1 lux | From a candle 1 meter away |
| 80 lux | At an office building corridor |
| 500 lux | Light in an office |
| 10000 lux | In the daytime |
| 100000 lux | Strong sunlight |

It should be noted that, in this embodiment of this application, the first parameter value and the second parameter may be collected by the long-focus camera or determined by the processor 110 of the electronic device. For example, a controller may be further included inside the long-focus camera. The controller obtains the shake amount from the gyroscope in the long-focus camera, or determines the shake amount according to formula (1), to further determine the target push amount (that is, the first parameter value). The controller may further control the driving assembly (the OIS motor) to reversely push the optical path adjustment assembly, so as to determine the actual push amount and the second parameter value.

In an example, the first neural network model in this embodiment of this application first includes a feature conversion layer used to convert, into feature data, the multi-modal data and the N images in the RAW, RGB, or BMP format that are input into the first neural network model. For example, the feature conversion layer may be implemented by using two convolutional layers: a first convolutional layer and a second convolutional layer. The first convolutional layer is used to convert the multi-modal data into first feature data. The second convolutional layer is used to: convert the N images in the RAW, RGB, or BMP format into second feature data, and then merge the first feature data and the second feature data into the feature data.

For example, a three-layer encoder-decoder structure is used when the first neural network model performs subsequent processing on the feature data. In one embodiment, resolution of an input/output of a first layer is $\frac{1}{16}$ of resolution of a raw image, resolution of an input/output of a second layer is $\frac{1}{4}$ of resolution of the raw image, and resolution of an input/output of a third layer is resolution of the raw image. A maxpooling layer may be used for resolution downsampling between the three encoder-decoder layers, and a deconvolution (deconv) layer is used to align sizes.

In this embodiment of this application, the multi-modal data is used as an input into the first neural network model to guide a translational blurring degree and a rotational image blurring degree of each pixel of each frame. A first neural network model that can quantize a blurring degree is established, instead of performing image-based blur estimation and performing blind deblurring. In this way, a network is more easily converged and better effect is achieved.

In addition, both the multi-modal data and the input image are converted into the feature data, instead of directly processing the image, so that the first neural network model can be compatible with functions such as de-noising, enhancement, and de-mosaicing.

The first neural network model mentioned in this embodiment of this application may be obtained through training in advance by using sample data. In this embodiment of this application, the sample data may be determined based on a requirement for processing an image by the first neural network model.

For example, the first neural network model is used to implement rotational image deblurring, and the sample data includes a sample image, N blurred sample images, and a third parameter value corresponding to each of the N blurred sample images. The third parameter value corresponding to the blurred sample image is calculated based on an amount that is of shake generated during image photographing and that is obtained within specified duration. A blurred sample image may be obtained by performing blurring processing on a sample image based on a third parameter value corresponding to the blurred sample image. A first blurred sample image is used as an example, and the first blurred sample image is any one of the N blurred sample images. The first blurred sample image may be obtained by performing blurring processing on a sample image based on a third parameter value corresponding to the first blurred sample image, that is, the sample image is blurred based on the third parameter value to obtain the first blurred sample image.

For another example, the first neural network model is used to implement rotational image deblurring, and the sample data includes a sample image, N blurred sample images, and a third parameter value and exposure time that correspond to each of the N blurred sample images. All of the N blurred sample images correspond to the same exposure time. A third parameter value corresponding to a blurred sample image is calculated based on an amount that is of shake generated during image photographing and that is obtained at the exposure time and within specified duration.

For another example, the first neural network model is used to implement rotational image deblurring and translational deblurring, and the sample data includes a sample image, N blurred sample images, a third parameter value corresponding to each of the N blurred sample images, and a fourth parameter value corresponding to each of the N blurred sample images. The fourth parameter value is a specified value. A fourth parameter value corresponding to the first blurred sample image is a quantized value used to represent a degree of a translational blur generated in the first blurred sample image. A blurred sample image may be obtained by performing blurring processing on the sample image based on the third parameter value and the fourth parameter value that correspond to the blurred sample image. A first blurred sample image is used as an example. The first blurred sample image may be obtained by performing blurring processing on the sample image based on a third parameter value and a fourth parameter value that correspond to the first blurred sample image.

For another example, the first neural network model is used to implement rotational image deblurring and translational deblurring, and the sample data includes a sample image, N blurred sample images, a third parameter value corresponding to each of the N blurred sample images, and a fourth parameter value and an exposure parameter that correspond to each of the N blurred sample images. A third parameter value corresponding to a blurred sample image is calculated based on an amount that is of shake generated during image photographing and that is obtained at the exposure time and within specified duration.

In addition, the first neural network model may be further used to implement de-noising, de-mosaicing, or enhancement processing. In this case, the blurred sample image may be an image obtained by adding noise, mosaics, or the like to an image that is obtained by performing blurring processing on the sample image.

The following describes a training mode of the first neural network model by using an example in which a sample image includes sample data that includes a sample image, N blurred sample images, a third parameter value corresponding to each of the N blurred sample images, and a fourth parameter value and exposure time that correspond to each of the N blurred sample images.

Before the first neural network model is trained, the sample data needs to be obtained.

A blurred sample image is obtained by performing blurring processing on the sample image based on a third parameter value and a fourth parameter value that correspond to a first blurred sample image. During blurring processing, rotation blurring processing may be performed based on an association relationship between a third parameter value and a rotational image blur, and translational blurring processing may be performed based on an association relationship between a fourth parameter value and a translational image blur.

Because a case in which a hand tremor occurs when a user holds an electronic device is related to a weight of the electronic device held by the hand, a case in which a hand tremor occurs when a 500-gram mobile phone is held is different from a case in which a hand tremor occurs when two or heavier apparatuses are held. Therefore, when sample data is collected, if a clear image and a blurred image are actually collected, one manner is that the blurred image and the clear image are separately collected. In one embodiment, in a same scene, a tripod is used to place an electronic device to photograph the clear image, and an electronic device is held to photograph the blurred image. However, it cannot be ensured that the blurred image and the clear image are the same in terms of a hand tremor frequency/amplitude, exposure, ISO, and other image processing algorithm strength. Another manner is that if two electronic devices are bound for simultaneous collection, it may not be ensured that fields of view (FOV) of the two electronic devices are completely the same. In addition, because a case in which a hand tremor occurs when one electronic device is held is different from a case in which a hand tremor occurs when two electronic devices are held, it cannot be ensured that hand tremor angles are the same when the clear image and the blurred image are captured. Based on this, in this embodiment of this application, a data degradation system may be created, to implement quantitative degradation from a stable clear image to a blurred image based on multi-modal data. Therefore, a blurred image may be constructed based on any clear image of a third-party device or the image photographed by the electronic device placed on the tripod. The data degradation system includes an association relationship between the multi-modal data, and a translational image blur and a rotational image blur.

It should be noted that, in this embodiment of this application, the first parameter value and the third parameter value correspond to a same type of parameter, and both are used to describe a target push amount of pushing a reflective lens to implement optical image stabilization. The second parameter value and the fourth parameter value correspond to a same type of parameter, and both are used to describe an actual push amount of pushing the reflective lens to implement optical image stabilization. In this embodiment of this application, for ease of differentiation, in actual application, a quantized value of a rotational blur that is obtained during image capture is referred to as a first parameter value, and a quantized value of a rotational blur that is used during construction of a blurred sample image is referred to as a third parameter value. In actual application, a quantized value of a translational blur that is obtained during image capture is referred to as a second parameter value, and a quantized value of a translational blur that is used during construction of a blurred sample image is referred to as a fourth parameter value.

In one embodiment, the association relationship between a third parameter value and a rotational image blur may be determined in the following manner.

The third parameter value may be determined based on a hand tremor angle. Herein, $CODE_x$ is used to represent the third parameter value, and $angle_{hand}$ is used to represent the hand tremor angle.

A quantity $pixel_x$ of rotationally blurred pixels caused by the hand tremor angle may be determined according to the foregoing formula (3).

$$\text{angle}_{image} = b \times \text{pixel}_x + c \quad \text{Formula (6)}$$

$\text{angle}_{image}$ represents an image rotation angle, and b and c are empirical values based on experiments. In an example, $-0.005 < b < 0.005$, and $-0.01 < c < 0.01$.

In addition, blurring degrees of different pixels in an image may be different. In a rotational image blur, the center of the image is not blurred, and a blurring degree is higher in a position closer to the edge. In an optional manner, in this embodiment of this application, rotational image blurring degrees of different pixels are determined according to the following formula (7):

$$R_{w \times h} = \sqrt{(w1 - c\_w)^2 + (h1 - c\_h)^2} \quad \text{Formula (7)}$$

w1 represents a horizontal coordinate of a pixel, h1 represents a vertical coordinate of the pixel, c_w represents a horizontal coordinate of an image center, and c_h represents a vertical coordinate of an image center.

In one embodiment, the association relationship between a fourth parameter value and a translational image blur may be determined in the following manner.

$$\Delta y = d \times \tan \theta_y \quad \text{Formula (8)}$$

$$\theta_y = |\text{angle}_{hand} - \text{angle}_{OIS}| \quad \text{Formula (9)}$$

$$\text{angle}_{OIS} = \arctan\left(\frac{\text{CODE}_{actual}}{\text{CODE}_{propose}} \times \tan(\text{angle}_{propose})\right) \quad \text{Formula (10)}$$

$$d = \frac{r}{2 \times \tan \frac{fov}{2}} \quad \text{Formula (11)}$$

$$r = \sqrt{w^2 + h^2} \quad \text{Formula (12)}$$

$$\text{angle}_{propose} = -\text{angle}_{hand} \quad \text{Formula (13)}$$

$$\Delta \text{CODE} = \text{CODE}_{propose} - \text{CODE}_{actual} \quad \text{Formula (14)}$$

$\Delta y$ represents a translational image blurring amount. $\theta_y$ represents a difference between a hand tremor angle and an actual OIS image stabilization angle, d represents a distance from an optical center of a long-focus camera to a plane in which an image sensor is located, fov represents a field of view of the long-focus camera, w represents an image width, and h represents an image height.

Figure 7:
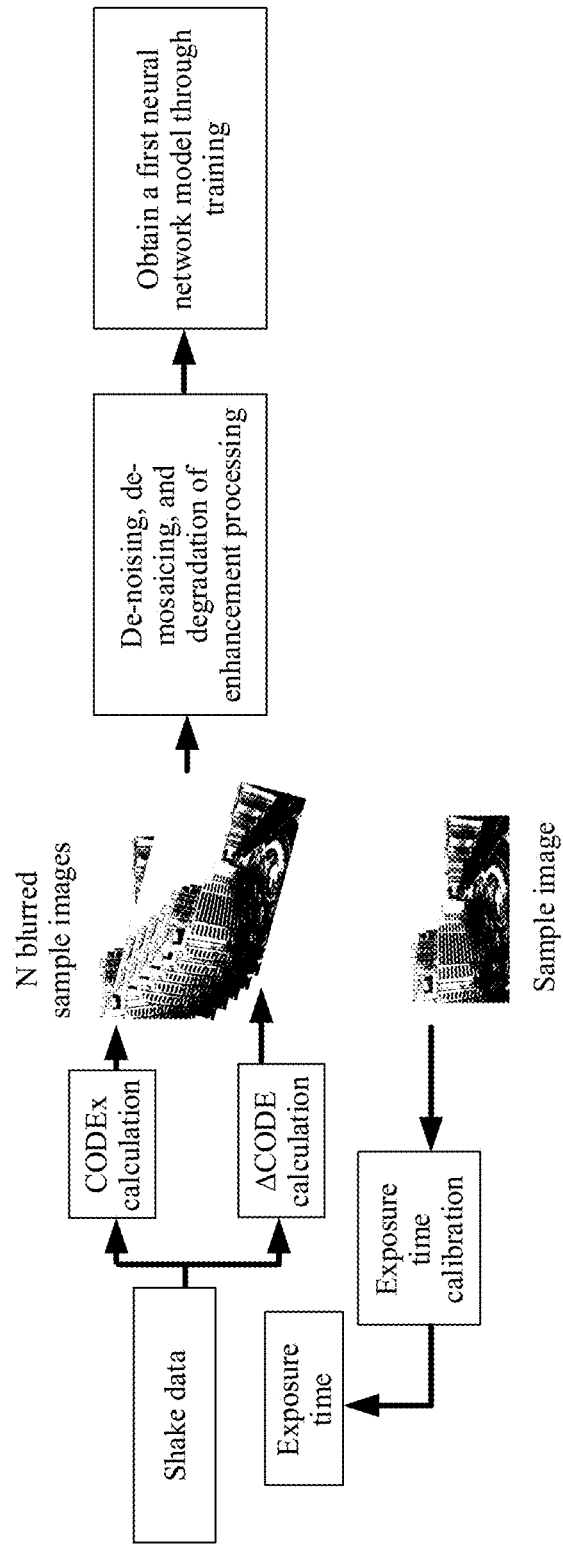
FIG. 7 is a schematic flowchart of training a first neural network model according to an embodiment of this application.

In an example, refer to FIG. 7. When sample data is determined, shake data is obtained. A start point at which exposure starts may be selected randomly from the shake data, and a shake amount may be selected based on exposure time. In one embodiment, start points at which N times of exposure start may be randomly selected, that is, N shake amounts are selected based on the exposure time. Exposure time of the N shake amounts is the same, for example, is 0.05 s. For example, the exposure time may be determined through exposure time calibration of a sample image, for example, exposure time of the sample image is selected. Then, a hand tremor angle may be determined based on the shake amount. Further, a value of $\text{CODE}_x$, that is, the third parameter value, is determined according to formula (2). A rotational image blurring amount (which may include a rotation angle, a quantity of rotated pixels, and a pixel blurring degree) may be determined according to formula (3), formula (6), and formula (7). $\Delta \text{CODE}$, that is, a fourth parameter value, may be determined randomly, and then a translational blur amount is determined according to formula (8) to formula (13). Blurring processing is performed on a selected clear sample image based on a rotational image blurring amount and a translational blurring amount. For example, when blurring processing is performed based on the rotational image blurring amount, the sample image may be rotated by a corresponding rotation angle, and a corresponding quantity of pixels are blurred based on a quantity of rotated pixels and a pixel blurring degree.

If the first neural network model may be further used to implement de-noising, de-mosaicing, or enhancement processing, de-noising, de-mosaicing, or data degradation of enhancement processing may be performed based on an image obtained by performing blurring processing on the sample image, for example, noise addition, mosaics addition, and weakening processing, are performed on the image obtained by performing blurring processing on the sample image, to obtain a blurred sample image.

A long-focus camera with a zoom ratio of 10× is used as an example. For example, a value of a in the formula (3) is 28300, a value of b in the formula (6) is 0.002, and a value of c is 0.0083. When the hand tremor angle range falls within $[-0.5°, 0.5°]$, the image rotation angle falls within $[-0.486°, 0.502°]$. Refer to FIG. 7. A height of an image is 2464 (pixels), a length of the image is 3280 (pixels), and a length of a diagonal is 4102 (pixels).

In this case, $$\tan(\text{mage rotation arc}) = \frac{\text{Maximum rotational image blurring amount}}{\text{Boundary pixel quantity}}.$$

For example, the determined hand tremor angle is 0.502°. The image rotation angle is 0.502°, and in this case, $$\tan\left(\frac{0.502 * 3.14}{180}\right) = \frac{\text{Maximum rotational image blurring amount}}{\text{Boundary pixel quantity}}.$$

Figure 8A:
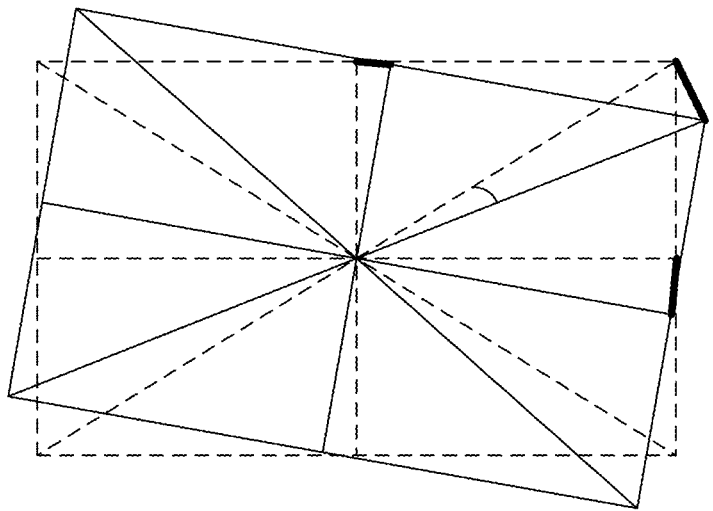
FIG. 8A is a schematic diagram of determining a rotational image blurring amount according to an embodiment of this application.

It may be determined that, in an image corresponding to FIG. 8A, a quantity of blurred pixels on a long edge boundary is 14, a quantity of blurred pixels on a short edge boundary is 11, and a quantity of blurred pixels on a diagonal boundary is 18.

It should be noted that, a maximum rotational image blurring amount of a boundary means that blurring occurs in each pixel on the boundary, and pixels with a maximum rotational image blurring amount on the boundary are blurred together. For example, if the quantity of blurred pixels on the long edge boundary is 14, blurring in each pixel on the long edge boundary means that 14 pixels are blurred into one pixel. For another example, if the quantity of blurred pixels on the short edge boundary is 11, blurring in each pixel on the short edge boundary means that 11 pixels are blurred into one pixel.

Figure 8B:
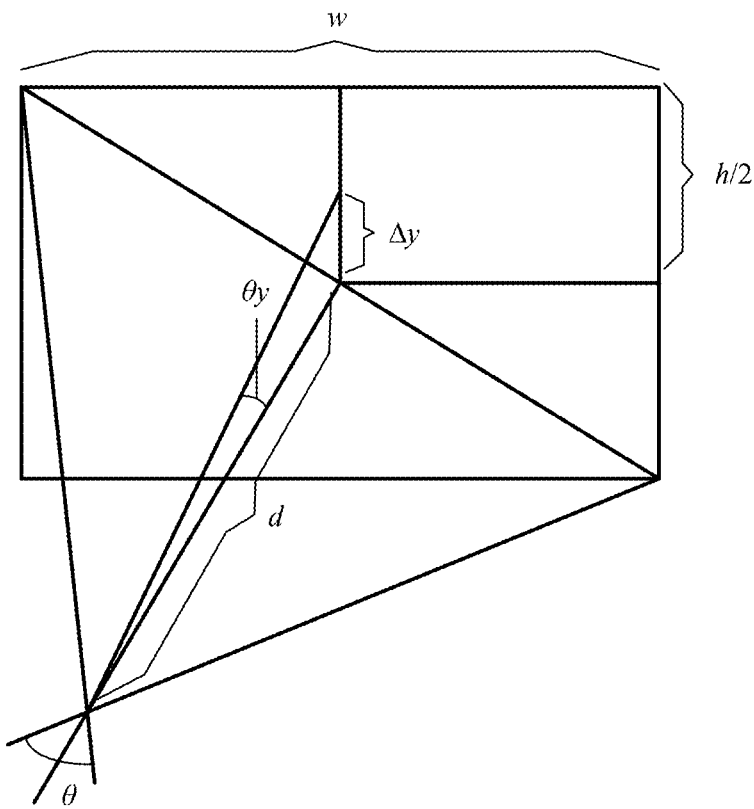
FIG. 8B is a schematic diagram of determining a translational blur amount according to an embodiment of this application.

During blurring processing, an image may be rotated by 0.502°, and then a corresponding pixel is blurred based on a quantity of blurred pixels on each boundary and a blurring degree. When the hand tremor angle is 0.5°, $\text{CODE}_{propose}$ is 1500, and $\Delta_{CODE}$ is 50. For example, refer to FIG. 8B. It is determined that $\Delta y$ is 8.7026 according to the formula (8) to the formula (14). In this case, a translational blur of 8.702 pixels occurs in a Y direction of an image, and translational blurring processing may be performed on the 8.702 pixels.

The following describes, by using an example with reference to a particular photographing scene, solutions provided in embodiments of this application. For example, the electronic device 100 is a mobile phone. The electronic device may include a long-focus camera, a medium- and long-focus camera, a primary camera, and a wide-angle camera. For example, a zoom ratio of the long-focus camera is 10, a zoom ratio of the medium- and long-focus camera satisfies A2=3, and a zoom ratio of the wide-angle camera is less than 1 and greater than 0.

Figure 9A:
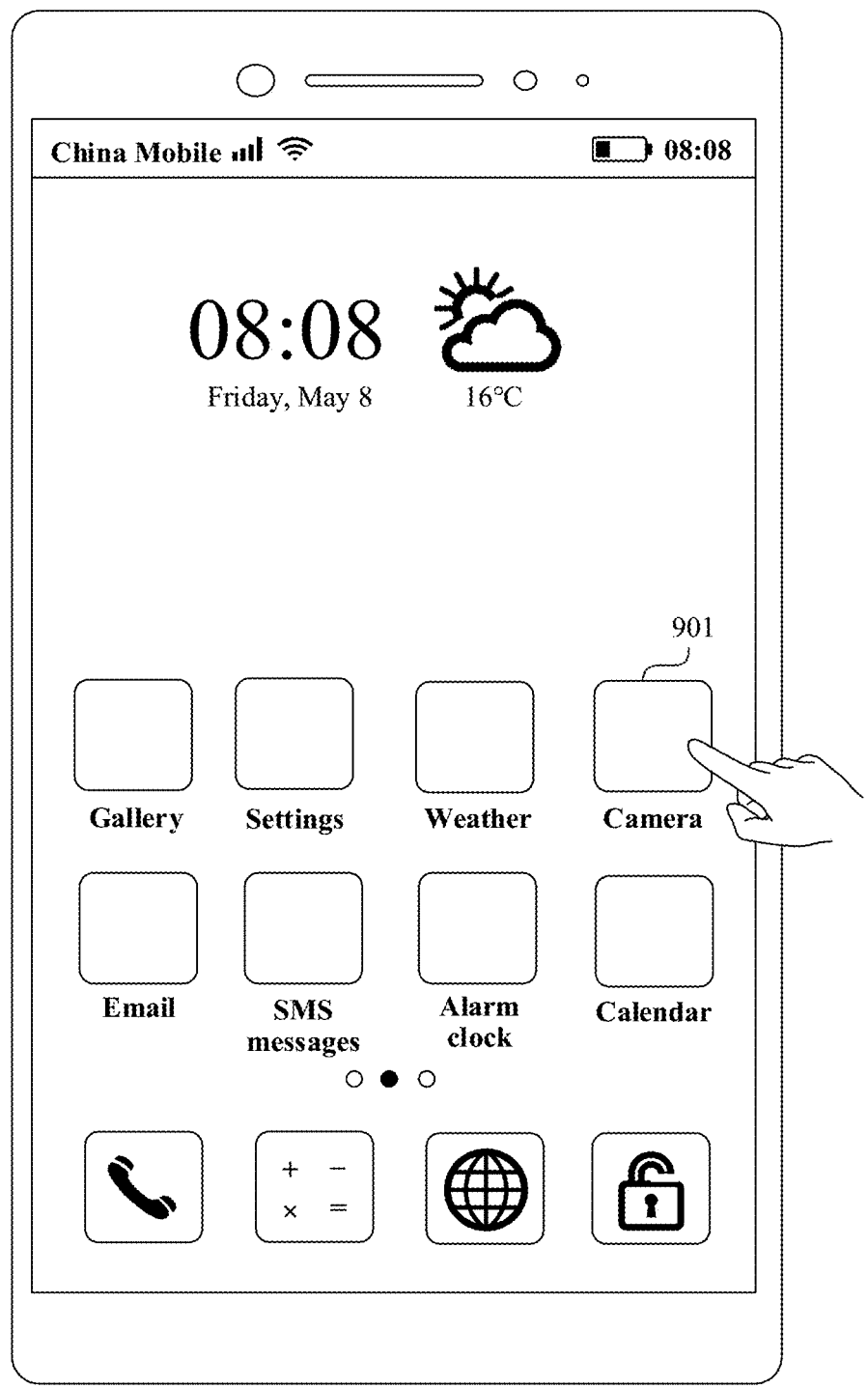
FIG. 9A is a schematic diagram of a user interface according to an embodiment of this application.
Figure 9B:
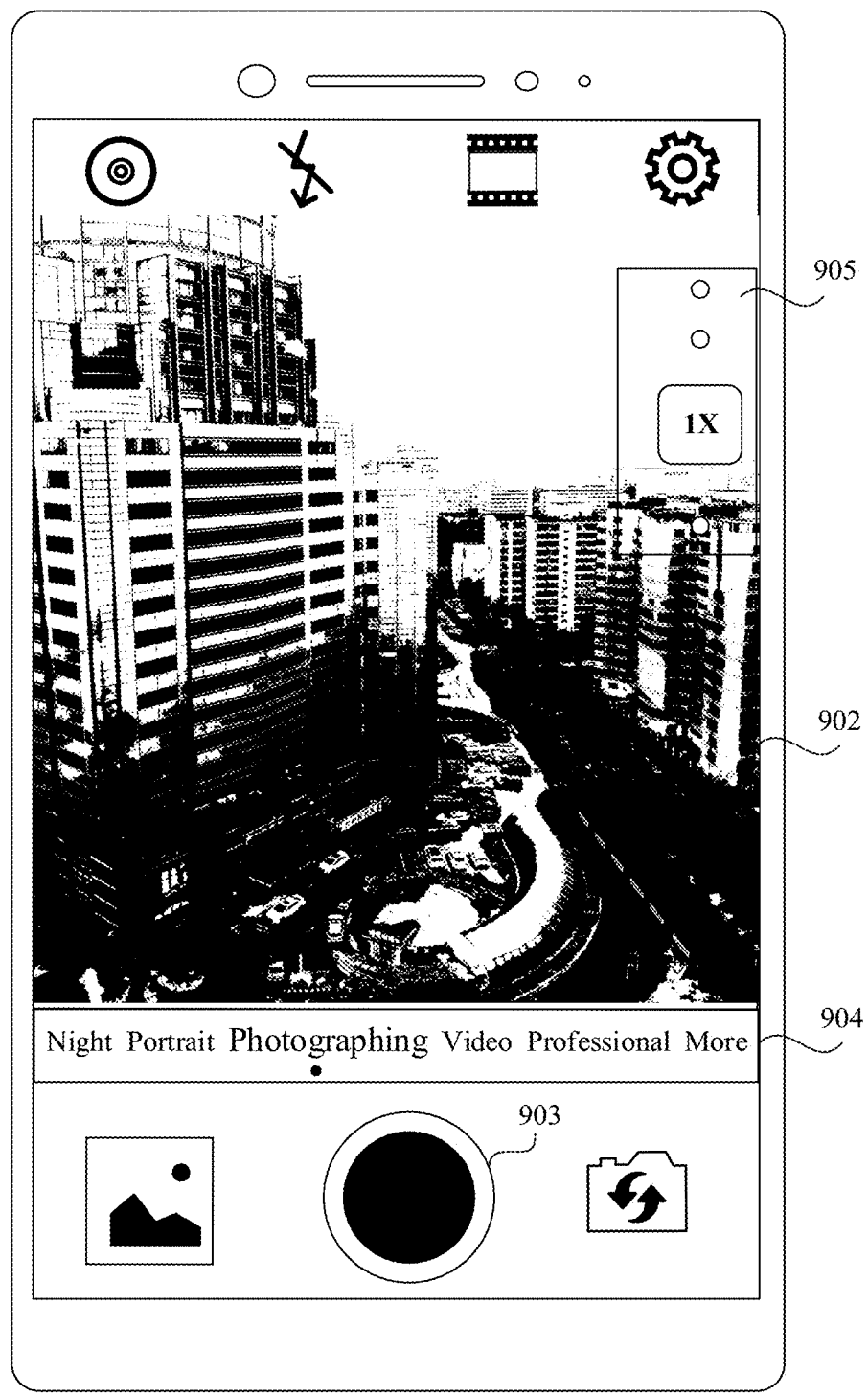
FIG. 9B is a schematic diagram of another user interface according to an embodiment of this application.

In an example, FIG. 9A shows a graphical user interface (GUI) of an electronic device. The GUI is a desktop of the electronic device. When a user taps an icon 901 of a camera application (APP) on the desktop, the electronic device may start the camera application in response to an operation of tapping the icon 901 by the user, and display a GUI of the camera application on a display. For example, the GUI of the camera application may be shown in FIG. 9B, and may also be referred to as a viewfinder screen. For example, as shown in FIG. 9B, the viewfinder screen includes a viewfinder frame 902, a photographing control 903, a photographing mode control bar 904, a zoom ratio option area 905, and the like. The viewfinder frame 902 may be used to preview a to-be-photographed image or video picture, and the image or the video picture in the viewfinder frame 902 is presented based on an image captured by a camera in real time. The photographing mode control bar 904 may include a plurality of photographing mode controls, for example, "Night", "Portrait", "Photo", "Video", "Special effect video", and "More". In some embodiments, the zoom ratio option area 905 may include any one or more zoom ratio options in 0.5× to 100×. For example, zoom ratio options that may be included in the zoom ratio option area 905 may include 50×, 10×, 1×, 0.75×, and the like. For example, as shown in FIG. 9B, in the zoom ratio option area 905, a zoom ratio selected by the user is 1×, and the electronic device may set, in response to the zoom ratio selected in the zoom ratio option area 905, a zoom ratio used during photographing, that is, obtain a target zoom ratio of 1×. The electronic device may start the primary camera to implement photographing. It should be noted that, because a zoom ratio is increased, a distant scene may be zoomed in, and a picture range of a captured image is narrowed. However, this is more conducive to displaying a detail feature of the image. In contrast, when the zoom ratio is decreased, a range of a captured image may be expanded, so that a larger-range captured image can be displayed. For example, in response to a shortcut gesture operation of the user, the electronic device determines that a zoom ratio is 1×, that is, obtains a target zoom ratio of 1×, and starts the primary camera. The electronic device may start the primary camera to implement photographing.

With reference to different cases, the following describes a process in which a mobile phone starts, based on a zoom ratio selected by a user, a corresponding camera to implement photographing.

Figure 9C:
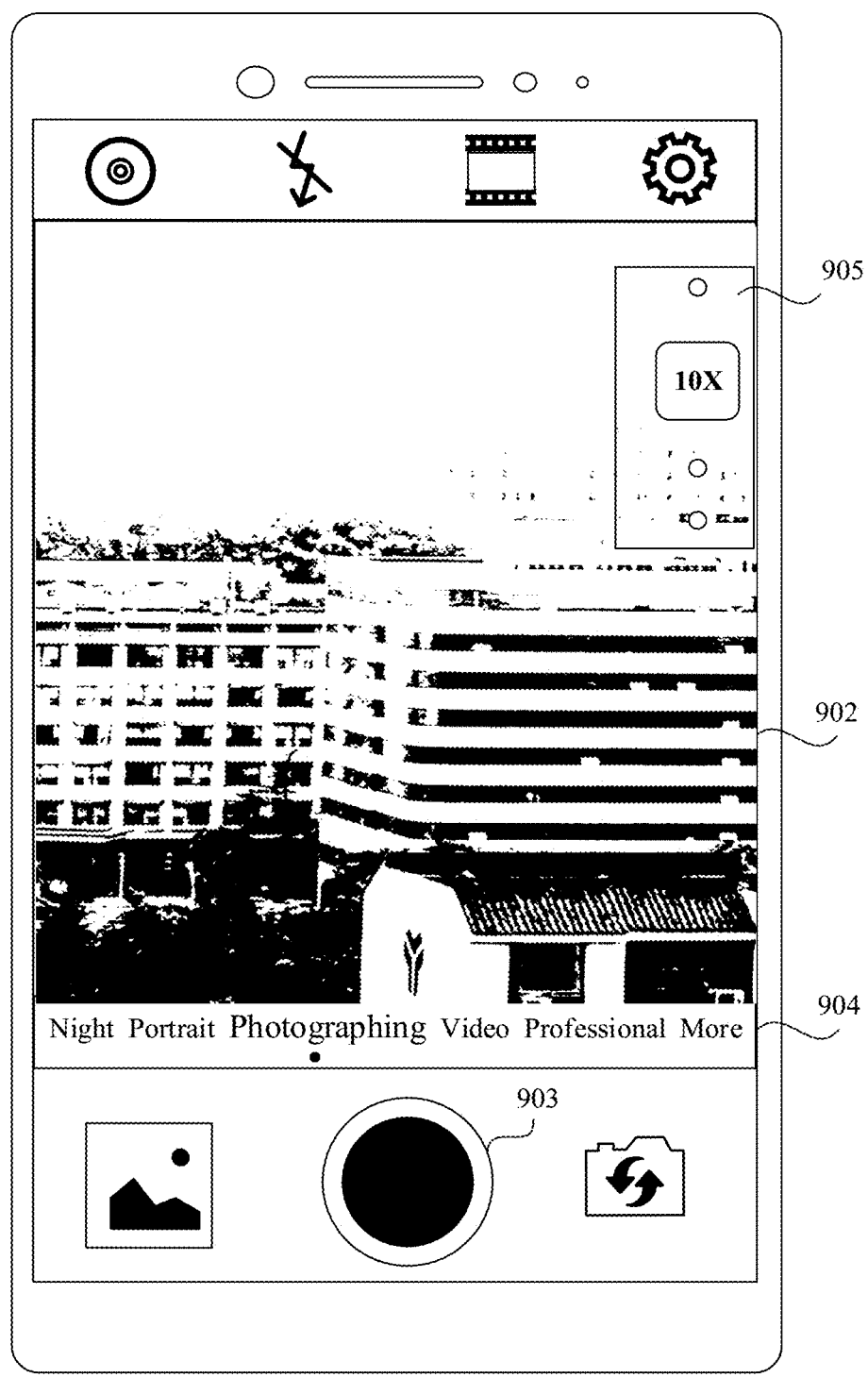
FIG. 9C is a schematic diagram of still another user interface according to an embodiment of this application.

In case 1, the electronic device includes a long-focus camera. As shown in FIG. 9C, in the zoom ratio option area 905, a zoom ratio selected by the user is greater than a first zoom ratio threshold. For example, the first zoom ratio threshold is less than or equal to a zoom ratio of the long-focus camera. For example, the zoom ratio of the long-focus camera is 10×, and the first zoom ratio threshold is 9.9×. FIG. 9C shows an example in which the zoom ratio selected by the user is 10×. The mobile phone may set, in response to the zoom ratio selected in the zoom ratio option area 905, a zoom ratio used during photographing, that is, obtain a target zoom ratio of 10×, and start the long-focus camera. The mobile phone performs S602 of capturing N first images by using the long-focus camera. Further, the mobile phone 100 performs S603 of performing first image processing on the N first images to obtain a first target image. Then, the first target image is displayed on the display 194.

In case 2, the electronic device includes a long-focus camera and a medium- and long-focus camera.

In a first example, a zoom ratio selected by the user by performing a shortcut gesture operation or in the zoom ratio option area 905 is greater than a first zoom ratio threshold. For example, the first zoom ratio threshold is less than or equal to a zoom ratio of the long-focus camera. For example, the zoom ratio of the long-focus camera is 10×, and the first zoom ratio threshold is 9.9×. FIG. 9C shows an example in which the zoom ratio selected by the user is 10×. The electronic device may set, in response to the zoom ratio selected in the zoom ratio option area 905, a zoom ratio used during photographing, that is, obtain the target zoom ratio of 10×, and start the long-focus camera. The electronic device performs S602 of capturing N first images by using the long-focus camera. Further, the electronic device 100 performs S603 of performing first image processing on the N first images to obtain a first target image. Then, the first target image is displayed on the display 194.

In a second example, a zoom ratio selected by the user by performing a shortcut gesture operation or in the zoom ratio option area 905 is greater than the first zoom ratio threshold and less than the zoom ratio of the long-focus camera. For example, the first zoom ratio threshold is 7.9, the zoom ratio of the long-focus camera is 10×, and the zoom ratio selected by the user is greater than 7.9 and less than 10, for example, is 8×. The electronic device may set, in response to the zoom ratio of 8× selected by the user by performing a shortcut gesture operation, a zoom ratio used during photographing, that is, obtain the target zoom ratio of 8×, and start the long-focus camera and the medium- and long-focus camera. The electronic device captures N first images by using the long-focus camera and captures M second images by using the medium- and long-focus camera. Further, deblurring processing is performed on at least the N first images via the first neural network model to obtain a third image, the M second images are processed via the second neural network model to obtain a fourth image, and then a first target image is obtained based on the third image and the fourth image. The first target image is displayed on the display 194.

In a third example, a zoom ratio selected by the user by performing a shortcut gesture operation or in the zoom ratio option area 905 is less than or equal to a first zoom ratio threshold and greater than or equal to a zoom ratio of the medium- and long-focus camera. For example, the first zoom ratio threshold is 7.9, the zoom ratio of the medium- and long-focus camera is 3×, and a zoom ratio selected by the user is less than 7.9 and greater than or equal to the zoom ratio of the medium- and long-focus camera, for example, is 4×. The electronic device may set, in response to the zoom ratio of 4× selected by the user by performing a shortcut gesture operation, a zoom ratio used during photographing, that is, obtain a target zoom ratio of 4×, and start the medium- and long-focus camera. The electronic device captures one or more images by using the medium- and long-focus camera, and processes, via the second neural network model, the one or more images captured by using the long-focus camera, to obtain the second target image. The second target image is displayed on the display 194.

In case 3, the electronic camera includes a primary camera, a long-focus camera, and a medium- and long-focus camera.

In a first example, a zoom ratio selected by the user by performing a shortcut gesture operation or in the zoom ratio option area 905 is greater than a first zoom ratio threshold. For example, the first zoom ratio threshold is less than or equal to a zoom ratio of the long-focus camera. For an operation that may be performed by the electronic device in response to the zoom ratio selected in the zoom ratio option area 905, refer to corresponding descriptions of the first example in case 2. Details are not described herein again.

In a second example, a zoom ratio selected by the user by performing a shortcut gesture operation or in the zoom ratio option area 905 is greater than a first zoom ratio threshold and less than a zoom ratio of the long-focus camera. For an operation that may be performed by the electronic device in response to the zoom ratio selected in the zoom ratio option area 905 or the zoom ratio selected by performing the shortcut gesture operation, refer to corresponding descriptions of the second example in case 2. Details are not described herein again.

In a third example, a zoom ratio selected by the user by performing a shortcut gesture operation or in the zoom ratio option area 905 is less than or equal to a first zoom ratio threshold and greater than or equal to a zoom ratio of the medium- and long-focus camera. For an operation that may be performed by the electronic device in response to the zoom ratio selected in the zoom ratio option area 905 or the zoom ratio selected by performing the shortcut gesture operation, refer to corresponding descriptions of the third example in case 2. Details are not described herein again.

In a fourth example, the zoom ratio selected by the user by performing a shortcut gesture operation or in the zoom ratio option area 905 is less than or equal to a zoom ratio of the medium- and long-focus camera. The electronic device may set, in response to the zoom ratio selected by the user by performing the shortcut gesture operation or in the zoom ratio option area 905, a zoom ratio used during photographing, that is, obtain a target zoom ratio, where the target zoom ratio is less than or equal to the zoom ratio of the medium- and long-focus camera; and start the primary camera. The electronic device captures one or more images by using the primary camera, and processes, via the second neural network model, the one or more images captured by using the long-focus camera, to obtain the second target image. The second target image is displayed on the display 194.

In case 4, the electronic camera includes a primary camera, a long-focus camera, a medium- and long-focus camera, and a wide-angle camera.

For a first example to a fourth example, refer to corresponding descriptions of the first example to the fourth example in case 3. Details are not described herein again.

In a fifth example, a zoom ratio selected by the user by performing a shortcut gesture operation or in the zoom ratio option area 905 is less than a zoom ratio of the primary camera. The electronic device may set, in response to the zoom ratio selected by the user by performing the shortcut gesture operation or in the zoom ratio option area 905, a zoom ratio used during photographing, that is, obtain a target zoom ratio, where the target zoom ratio is less than the zoom ratio of the primary camera; and start the wide-angle camera. The electronic device captures one or more images by using the wide-angle camera and processes, via the second neural network model, the one or more images captured by using the long-focus camera, to obtain the second target image. The second target image is displayed on the display 194. It may be understood that, to implement functions in the foregoing method embodiments, the electronic device includes corresponding hardware structures and/or software modules for performing the functions. A person skilled in the art should be easily aware that, in combination with example modules and method operations described in embodiments disclosed in this application, this application can be implemented by hardware or a combination of hardware and computer software. Whether a function is performed by hardware or hardware driven by computer software depends on particular application scenarios and design constraints of the technical solutions.

Figure 10:
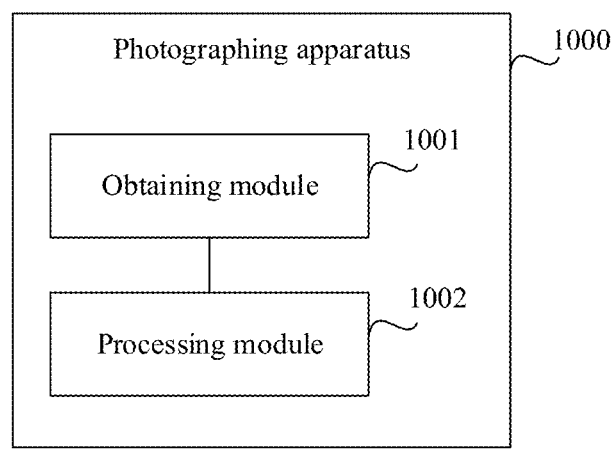
FIG. 10 is a schematic diagram of a structure of a photographing apparatus 1000 according to an embodiment of this application.

Based on a same inventive idea as the foregoing method, as shown in FIG. 10, an embodiment of this application further provides a photographing apparatus 1000. The photographing apparatus is used in an electronic device including a long-focus camera, for example, used in the electronic device 100 shown in FIG. 1. The electronic device includes at least the long-focus camera. The photographing apparatus may be configured to implement functions of the foregoing method embodiments, and therefore can implement beneficial effects of the foregoing method embodiments. The photographing apparatus may include an obtaining module 1001 and a processing module 1002. The obtaining module 1001 is configured to implement functions in the method embodiment shown in the foregoing FIG. 6. When the photographing apparatus 1000 is configured to implement the functions of the method embodiment shown in FIG. 6, the obtaining module 1001 may be configured to perform S601 and S602, and the processing module 1002 may be configured to perform S603.

For example, the obtaining module 1001 is configured to: obtain a zoom ratio; and capture N first images by using the long-focus camera when the zoom ratio is greater than a first zoom ratio threshold, where N is a positive integer, all of the N first images are images captured for a target scene, and a zoom ratio of the long-focus camera is less than the first zoom ratio threshold.

The processing module 1002 is configured to perform first image processing on the N first images to obtain a first target image.

The first image processing includes deblurring processing implemented via a first neural network model, and the deblurring processing includes rotational image deblurring.

In one embodiment, the electronic device further includes a first camera, and a zoom ratio of the first camera is less than the zoom ratio of the long-focus camera.

The obtaining module 1001 is further configured to: when the zoom ratio is greater than the first zoom ratio threshold and less than the zoom ratio of the long-focus camera, capture M second images by using the first camera, where all of the M second images are images captured for the target scene, and M is a positive integer.

The processing module 1002 is configured to: process the N first images via the first neural network model to obtain a third image, where the first neural network model is used at least to implement rotational image deblurring; process the M second images via a second neural network model to obtain a fourth image, where the second neural network model is used to implement translational image deblurring, and obtain the first target image based on the third image and the fourth image.

In one embodiment, the electronic device further includes a second camera, and a zoom ratio of the second camera is less than the first zoom ratio threshold.

The obtaining module 1001 is further configured to: when the zoom ratio is less than or equal to the first zoom ratio threshold, capture M second images by using the second camera, where all of the M second images are images captured for the target scene, and M is a positive integer.

The processing module 1002 is further configured to perform second image processing on the M second images to obtain a second target image, where the second image processing includes translational image deblurring via a second neural network model.

In one embodiment, the obtaining module 1001 is further configured to obtain a first parameter value in a process of capturing the N first images, where the first parameter value is a quantized value used to represent a degree of a rotational blur generated in the first image.

The processing module 1002 is configured to perform deblurring processing on the N first images via the first neural network model by using the first parameter value and the N first images as an input into the first neural network model.

In one embodiment, the long-focus camera includes a gyroscope. The obtaining module 1001 is configured to:

obtain a shake amount from the gyroscope, where the shake amount is a quantized value of shake generated in a process in which the long-focus camera captures the N first images; and determine the first parameter value based on the shake amount and a first rule, where the first rule includes an association relationship between the shake amount and a quantized value of a rotational image blurring degree.

In one embodiment, the deblurring processing further includes translational image deblurring.

In one embodiment, the obtaining module 1001 is further configured to obtain a first parameter value and a second parameter value in a process of capturing the N first images. The first parameter value is a quantized value used to represent a degree of a rotational blur generated in the first image, and the second parameter value is a quantized value used to represent a degree of a translational blur generated in the first image.

The processing module 1002 is configured to: perform deblurring processing on the N first images via the first neural network model by using the first parameter value, the second parameter value, and the N first images as an input into the first neural network model, and obtain the first target image based on an image obtained by performing the deblurring processing via the first neural network model.

In one embodiment, the obtaining module 1001 is further configured to obtain a first parameter value, a second parameter value, and exposure time of the first image in a process of capturing the N first images. The first parameter value is a quantized value used to represent a degree of a rotational blur generated in the first image, the second parameter value is a quantized value used to represent a degree of a translational blur generated in the first image, the exposure time of the first image is directly proportional to the degree of the rotational blur generated in the first image, and the exposure time of the first image is directly proportional to the degree of the translational blur generated in the first image The processing module 1002 is configured to: perform deblurring processing on the N first images via the first neural network model by using the first parameter value, the second parameter value, the exposure time of the first image, and the N first images as an input into the first neural network model, and obtain the first target image based on an image obtained by performing the deblurring processing via the first neural network model.

In one embodiment, the long-focus camera includes a gyroscope, an optical path adjustment assembly, and a driving assembly. The obtaining module 1001 is configured to:

obtain a shake amount from the gyroscope, and determine a push amount, where the shake amount is a quantized value of shake generated in a process in which the long-focus camera captures the N first images, and the push amount is a quantized value of an actual push force used by the driving assembly to push the optical path adjustment assembly; and determine the first parameter value based on the shake amount and a first rule, and determine the second parameter value based on the shake amount, the push amount, and a second rule, where the first rule includes an association relationship between the shake amount and a quantized value of a rotational image blurring degree; and the second rule includes an association relationship between a quantized value of a translational image blurring degree, and the shake amount and the push amount.

In one embodiment, the first image processing further includes at least one of the following:

de-noising processing, de-mosaicing processing, or enhancement processing, where the de-noising processing, the de-mosaicing processing, or the enhancement processing is implemented via the first neural network model.

In one embodiment, the first neural network model is obtained by training sample data.

The sample data includes at least a sample image, N blurred sample images, and a third parameter value and a fourth parameter value that correspond to each of the N blurred sample images. A third parameter value corresponding to a first blurred sample image is a quantized value used to represent a degree of a rotational blur generated in the first blurred sample image, the first blurred sample image is any one of the N blurred sample images, and the third parameter value corresponding to the first blurred sample image is calculated based on an amount that is of shake generated during image photographing and that is obtained within specified duration; and the fourth parameter value is a specified value, a fourth parameter value corresponding to the first blurred sample image is a quantized value used to represent a degree of a translational blur generated in the first blurred sample image, and the first blurred sample image is obtained by performing blurring processing on the sample image based on the third parameter value corresponding to the first blurred sample image and the fourth parameter value corresponding to the first blurred sample image.

In one embodiment, the sample data further includes exposure time corresponding to each of the N blurred sample images, exposure time corresponding to all of the N blurred sample images is the same, and the third parameter value corresponding to the first blurred sample image is calculated based on an amount that is of shake generated during image photographing and that is obtained at the exposure time and within specified duration.

Figure 11:
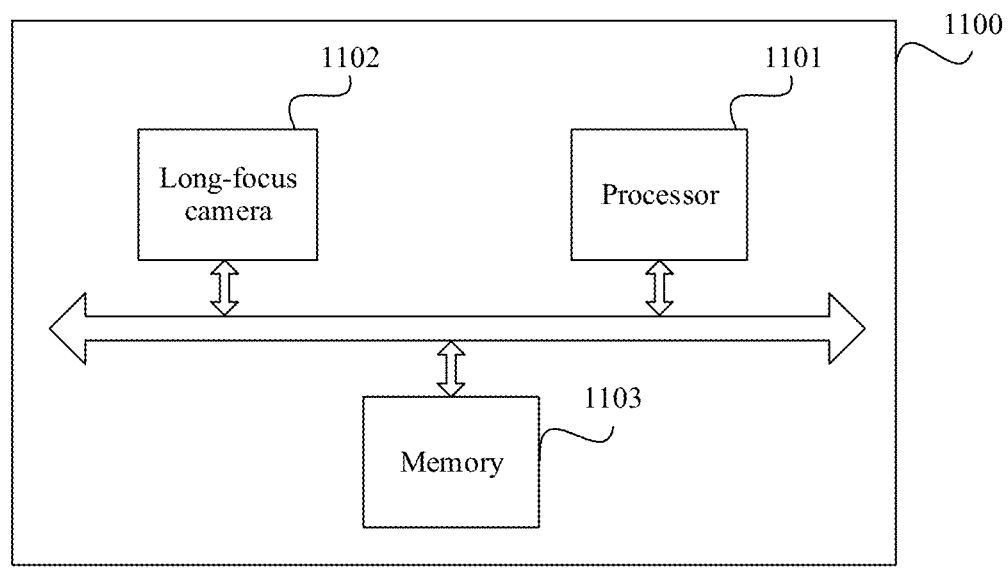
FIG. 11 is a schematic diagram of a structure of a photographing apparatus 1100 according to an embodiment of this application.

In view of this, an embodiment of this application further provides a photographing apparatus. As shown in FIG. 11, the photographing apparatus 1100 includes a processor 1101, a long-focus camera 1102, and a memory 1103. The memory 1103 is configured to: store instructions or a program executed by the processor 1101, store input data required by the processor 1101 to run instructions or a program, or store data generated after the processor 1101 runs instructions or a program. For more detailed descriptions of the long-focus camera, refer to related descriptions of the long-focus camera shown in FIG. 2. Details are not described herein again. The processor 1101 is configured to run the instructions or the program stored in the memory 1103, to perform functions in the method embodiment shown in FIG. 6. For example, when the photographing apparatus is configured to implement the method shown in FIG. 6, the processor 1101 is configured to perform functions of the obtaining module 1001 and the processing module 1002. For example, the processor 1101 may invoke the program or the instructions stored in the memory 1103. In this way, the obtaining module 1001 obtains a zoom ratio; and when the zoom ratio is greater than a zoom ratio threshold, controls the long-focus camera 1102 to capture the N first images. The processor 1101 invokes the program or the instructions stored in the memory 1103. In this way, the processing module 1002 may perform first image processing on the N first images to obtain a first target image. The first image processing includes deblurring processing implemented via a first neural network model, and the deblurring processing includes rotational image deblurring.

It should be understood that the processor mentioned in embodiments of this application may be a central processing unit (CPU), or the processor may be another general-purpose processor, a digital signal processor (DSP), an application-specific integrated circuit (ASIC), a field programmable gate array (FPGA) or another programmable logic device, a transistor logic device, a hardware component, or any combination thereof. The general-purpose processor may be a microprocessor, or the processor may be any conventional processor.

The method operations in embodiments of this application may be implemented by hardware, or may be implemented by a processor by executing software instructions. The software instructions may include a corresponding software module. The software module may be stored in a random access memory (RAM), a flash memory, a read-only memory (ROM), or a programmable read-only memory (programmable ROM, PROM), an erasable programmable read-only memory (erasable PROM, EPROM), an electrically erasable programmable read-only memory (electrically ePROM, EEPROM), a register, a hard disk, a removable hard disk, a CD-ROM, or a storage medium of any other form well-known in the art. For example, a storage medium is coupled to a processor, so that the processor can read information from the storage medium and can write information into the storage medium. Certainly, the storage medium may be a component of the processor. The processor and the storage medium may be located in an ASIC. In addition, the ASIC may be located in a terminal device. Certainly, the processor and the storage medium may exist in the terminal device as discrete components.

All or a part of the foregoing embodiments may be implemented by software, hardware, firmware, or any combination thereof. When software is used to implement embodiments, all or a part of embodiments may be implemented in a form of a computer program product. The computer program product includes one or more computer programs or instructions. When the computer program or instructions are loaded and executed on a computer, all or a part of the procedures or functions according to embodiments of this application are generated. The computer may be a general-purpose computer, a dedicated computer, a computer network, user equipment, or another programmable apparatus. The computer programs or instructions may be stored in a computer-readable storage medium or may be transmitted from a computer-readable storage medium to another computer-readable storage medium. For example, the computer programs or instructions may be transmitted from a website, computer, server, or data center to another website, computer, server, or data center in a wired or wireless manner. The computer-readable storage medium may be any usable medium accessible by a computer, or a data storage device, such as a server or a data center, integrating one or more usable media. The usable medium may be a magnetic medium, for example, a floppy disk, a hard disk, or a magnetic tape; or may be an optical medium, for example, a digital video disc (DVD); or may be a semiconductor medium, for example, a solid state drive (SSD).

In embodiments of this application, unless otherwise specified or a logic conflict occurs, terms and/or descriptions between different embodiments are consistent and may be mutually referenced, and technical features in different embodiments may be combined according to an internal logical relationship thereof to form a new embodiment. In addition, terms "include", "comprise", or any other variant thereof are intended to cover a non-exclusive inclusion, for example, include a series of operations or units. The method, system, product, or device is not necessarily limited to those operations or units that are clearly listed, but may include other operations or units that are not clearly listed or inherent to such a process, method, product, or device.

Although this application is described with reference to features and the embodiments thereof, it is clear that various modifications and combinations may be made to this application without departing from the spirit and scope of this application. Correspondingly, the specification and accompanying drawings are merely examples for description of the solutions defined by the appended claims, and are considered as any of or all modifications, variations, combinations or equivalents that cover the scope of this application.

It is clear that a person skilled in the art can make various modifications and variations to this application without departing from the scope of this application. This application is intended to cover these modifications and variations of embodiments of this application provided that they fall within the scope of protection defined by the following claims of this application and their equivalent technologies.

What is claimed is:

1. A photographing method applied to an electronic device including a long-focus camera comprising:
   obtaining a zoom ratio;
   capturing N first images by using the long-focus camera when the zoom ratio is greater than a first zoom ratio threshold, wherein N is a positive integer, all of the N first images are images captured for a target scene, and a zoom ratio of the long-focus camera is greater than or equal to the first zoom ratio threshold;
   obtaining a first parameter value in a process of capturing the N first images, wherein the first parameter value is used to represent a degree of a rotational blur generated in the first images; and
   performing first image processing on the N first images to obtain a first target image, wherein, performing the first image processing comprises:
   performing deblurring processing on the N first images via a first neural network model by using the first parameter value and the N first images as an input into the first neural network model; and
   obtaining the first target image based on an image obtained by performing the deblurring processing via the first neural network model, wherein the deblurring processing comprises rotational image deblurring.

2. The method according to claim 1, wherein, the zoom ratio of the long-focus camera is greater than 5.

3. The method according to claim 1, wherein, the electronic device further comprises a first camera, and a zoom ratio of the first camera is less than the first zoom ratio threshold, and when the zoom ratio is greater than the first zoom ratio threshold and less than the zoom ratio of the long-focus camera, the method further comprises:

capturing M second images by using the first camera, wherein, all of the M second images are images captured for the target scene, and M is a positive integer; and the performing first image processing on the N first images to obtain a first target image comprises:

processing the N first images via the first neural network model to obtain a third image, wherein the first neural network model is used at least to implement rotational image deblurring;

processing the M second images via a second neural network model to obtain a fourth image, wherein the second neural network model is used to implement translational image deblurring; and obtaining the first target image based on the third image and the fourth image.

4. The method according to claim 3, wherein, the zoom ratio of the first camera is less than or equal to 5 and greater than 1.

5. The method according to claim 1, wherein, the electronic device further comprises a second camera, and a zoom ratio of the second camera is less than the first zoom ratio threshold, and the method further comprises:

when the zoom ratio is less than or equal to the first zoom ratio threshold, capturing M second images by using the second camera, wherein, all of the M second images are images captured for the target scene, and M is a positive integer; and performing second image processing on the M second images to obtain a second target image, wherein the second image processing comprises translational image deblurring via a second neural network model.

6. The method according to claim 5, wherein, the zoom ratio of the second camera is less than or equal to 5 and greater than 0.

7. The method according to claim 1,
wherein, the first parameter value is a quantized value.

8. The method according to claim 1, wherein, the deblurring processing further comprises translational image deblurring.

9. The method according to claim 1, wherein, the first image processing further comprises at least one of:
de-noising processing, de-mosaicing processing, or enhancement processing, wherein the de-noising processing, the de-mosaicing processing, or the enhancement processing is implemented via the first neural network model.

10. The method according to claim 1, wherein, the first neural network model is obtained by training sample data, wherein, the sample data comprises at least a sample image, N blurred sample images, and a third parameter value and a fourth parameter value that correspond to each of the N blurred sample images, wherein, a third parameter value corresponding to a first blurred sample image is a quantized value used to represent a degree of a rotational blur generated in the first blurred sample image, the first blurred sample image is any one of the N blurred sample images, and the third parameter value corresponding to the first blurred sample image is calculated based on an amount that is of shake generated during image photographing and that is obtained within specified duration, and the fourth parameter value is a specified value, a fourth parameter value corresponding to the first blurred sample image is a quantized value used to represent a degree of a translational blur generated in the first blurred sample image, and the first blurred sample image is obtained by performing blurring processing on the sample image based on the third parameter value corresponding to the first blurred sample image and the fourth parameter value corresponding to the first blurred sample image.

11. A photographing apparatus used in an electronic device including a long-focus camera comprising:

an obtaining module configured to: obtain a zoom ratio, capture N first images by using the long-focus camera when the zoom ratio is greater than a first zoom ratio threshold, and obtain a first parameter value in a process of capturing the N first images, wherein N is a positive integer, all of the N first images are images captured for a target scene, and a zoom ratio of the long-focus camera is greater than or equal to the first zoom ratio threshold, wherein, the first parameter value is used to represent a degree of a rotational blur generated in the first images; and a processing module configured to perform first image processing on the N first images to obtain a first target image, wherein, perform the first image processing comprises:

perform deblurring processing on the N first images via a first neural network model by using the first parameter value and the N first images as an input into the first neural network model, and obtain the first target image based on an image obtained by performing the deblurring processing via the first neural network model, and wherein the deblurring processing comprises rotational image deblurring.

12. The apparatus according to claim 11, wherein, the zoom ratio of the long-focus camera is greater than 5.

13. The apparatus according to claim 11, wherein, the electronic device further comprises a first camera, and a zoom ratio of the first camera is less than the first zoom ratio threshold wherein, the obtaining module is further configured to: when the zoom ratio is greater than the first zoom ratio threshold and less than the zoom ratio of the long-focus camera, capture M second images by using the first camera, wherein all of the M second images are images captured for the target scene, and M is a positive integer; and the processing module is further configured to: process the N first images via the first neural network model to obtain a third image, wherein the first neural network model is used at least to implement rotational image deblurring, process the M second images via a second neural network model to obtain a fourth image, wherein the second neural network model is used to implement translational image deblurring, and obtain the first target image based on the third image and the fourth image.

14. The apparatus according to claim 13, wherein, the zoom ratio of the first camera is less than or equal to 5 and greater than 1.

15. The apparatus according to claim 11, wherein, the electronic device further comprises a second camera, and a zoom ratio of the second camera is less than the first zoom ratio threshold, wherein, the obtaining module is further configured to: when the zoom ratio is less than or equal to the first zoom ratio threshold, capture M second images by using the second camera, wherein, all of the M second images are images captured for the target scene, and M is a positive integer; and the processing module is further configured to perform second image processing on the M second images to obtain a second target image, wherein, the second image processing comprises translational image deblurring via a second neural network model.

16. The apparatus according to claim 11, wherein, the first parameter value is a quantized value.

17. The apparatus according to claim 11, wherein, the deblurring processing further comprises translational image deblurring.

18. The apparatus according to claim 11, wherein, the first image processing further comprises at least one of:
de-noising processing, de-mosaicing processing, or enhancement processing, wherein the de-noising processing, the de-mosaicing processing, or the enhancement processing is implemented via the first neural network model.

19. The apparatus according to claim 11, wherein, the first neural network model is obtained by training sample data, wherein, the sample data comprises at least a sample image, N blurred sample images, and a third parameter value and a fourth parameter value that correspond to each of the N blurred sample images, wherein, a third parameter value corresponding to a first blurred sample image is a quantized value used to represent a degree of a rotational blur generated in the first blurred sample image, the first blurred sample image is any one of the N blurred sample images, and the third parameter value corresponding to the first blurred sample image is calculated based on an amount that is of shake generated during image photographing and that is obtained within specified duration; and the fourth parameter value is a specified value, a fourth parameter value corresponding to the first blurred sample image is a quantized value used to represent a degree of a translational blur generated in the first blurred sample image, and the first blurred sample image is obtained by performing blurring processing on the sample image based on the third parameter value corresponding to the first blurred sample image and the fourth parameter value corresponding to the first blurred sample image.

20. An electronic device comprising:
a memory;
a processor; and
a long-focus camera, wherein, the long-focus camera is configured to capture a static or dynamic image, wherein, the memory is configured to store a program or instructions; and
wherein, the processor is configured to implement the program or the instructions such that the electronic device performs operations including:
obtaining a zoom ratio;
capturing N first images by using the long-focus camera when the zoom ratio is greater than a first zoom ratio threshold, wherein N is a positive integer, all of the N first images are images captured for a target scene, and a zoom ratio of the long-focus camera is greater than or equal to the first zoom ratio threshold;
obtaining a first parameter value in a process of capturing the N first images, wherein the first parameter value is used to represent a degree of a rotational blur generated in the first images; and
performing first image processing on the N first images to obtain a first target image, wherein, performing the first image processing comprises:
performing deblurring processing on the N first images via a first neural network model by using the first parameter value and the N first images as an input into the first neural network model; and
obtaining the first target image based on an image obtained by performing the deblurring processing via the first neural network model, wherein the deblurring processing comprises rotational image deblurring.

* * * * *